(12) United States Patent
Koyata et al.

(10) Patent No.: US 6,735,252 B1
(45) Date of Patent: May 11, 2004

(54) ENCODING APPARATUS, DECODING APPARATUS, DECODING METHOD, RECORDING APPARATUS, RECORDING METHOD, REPRODUCING APPARATUS, REPRODUCING METHOD, AND RECORD MEDIUM

(75) Inventors: Tomohiro Koyata, Tokyo (JP); Ryohei Yasuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 687 days.

(21) Appl. No.: 09/635,744

(22) Filed: Aug. 10, 2000

(30) Foreign Application Priority Data

Aug. 23, 1999 (JP) .......................................... P11-235516
Nov. 16, 1999 (JP) .......................................... P11-326090

(51) Int. Cl.[7] ................................................ H04N 7/66
(52) U.S. Cl. ............................................... 375/240.11
(58) Field of Search ....................... 375/240.01, 240.03,
375/240.04, 240.05, 240.06, 240.07, 240.11,
240.12, 240.13, 240.14, 240.2, 240.22;
704/229, 230, 501, 503; 395/2.38, 213,
2.92; 341/50, 51; H04B 1/66; G10L 9/00

(56) References Cited

U.S. PATENT DOCUMENTS

| | | | | | |
|---|---|---|---|---|---|
| 5,677,994 A | * | 10/1997 | Miyamori et al. | ......... | 395/2.92 |
| 5,712,955 A | * | 1/1998 | Sonohara | ................... | 395/2.38 |
| 5,758,020 A | * | 5/1998 | Tsutsui | ....................... | 395/213 |
| 5,774,844 A | * | 6/1998 | Akagiri | ....................... | 704/230 |
| 5,899,970 A | * | 5/1999 | Sonohara | ................... | 704/229 |
| 6,104,321 A | * | 8/2000 | Akagiri | ....................... | 341/50 |
| 6,449,596 B1 | * | 9/2002 | Ejima | ......................... | 704/501 |

* cited by examiner

Primary Examiner—Tung T. Vo
(74) Attorney, Agent, or Firm—Oblon, Spivak, McClelland, Maier & Neustadt, P.C.

(57) ABSTRACT

An encoding apparatus for highly efficiently encoding an input digital signal includes a band dividing means, an encoding means, a normalization processing means for normalizing a signal component of each block encoded by the encoding means and generating a normalization signal, a quantization coefficient calculating means, a bit allocating means for deciding the number of allocated bits for each block corresponding to the quantization coefficients calculated by the quantization coefficient calculating means, a normalization information changing means for gradually changing the normalization information generated by the normalization processing means corresponding to a user's operation on a time base, and an encoded data generating means.

27 Claims, 16 Drawing Sheets

Fig. 3

| Byte | Content | |
|---|---|---|
| 0 | BLOCK SIZE MODE INFORMATION | |
| 1 | NUMBER OF CONTAINED UNIT BLOCKS AND DUAL WRITE INFORMATION | |
| 2 | BIT ALLOCATION INFORMATION | |
| | SCALE FACTOR INFORMATION | |
| | SPECTRUM DATA | 212 BYTES |
| | SCALE FACTOR DUALLY WRITTEN | |
| | BIT ALLOCATION DUALLY WRITTEN | |
| 210 | FIRST BYTE DATA DUALLY WRITTEN | |
| 211 | 0-th BYTE DATA DUALLY WRITTEN | |

Fig. 4

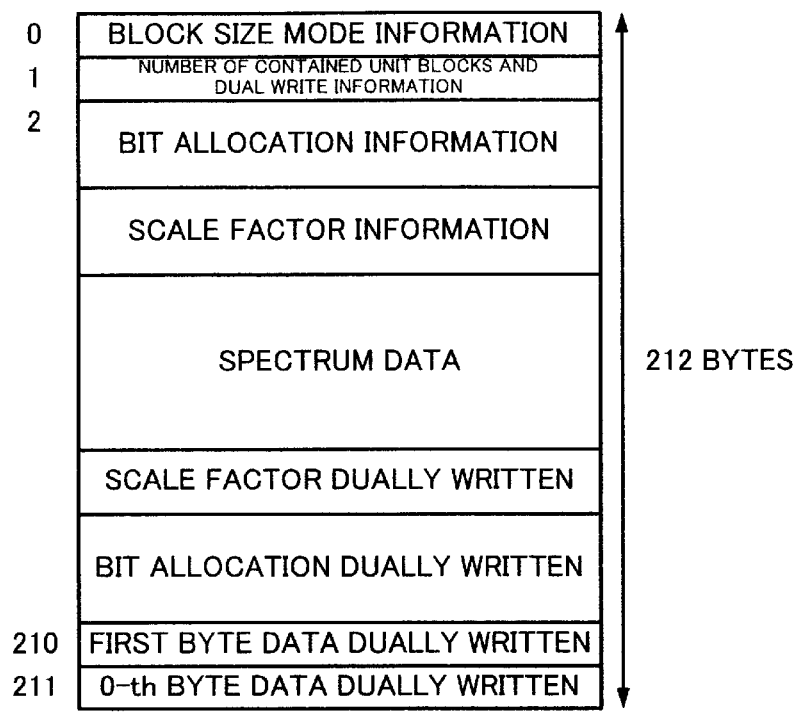

| NUMBER OF UNIT BLOCKS CONTAINED | | BIT ALLOCATION INFORMATION DUALLY WRITTEN | | SCALE FACTOR INFORMATION DUALLY WRITTEN | |
|---|---|---|---|---|---|
| CODE | QTY | CODE | QTY | CODE | QTY |
| 000 | 20 | 00 | 0 | 000 | 0 |
| 001 | 28 | 01 | 28 | 001 | 8 |
| 010 | 32 | 10 | 44 | 010 | 12 |
| 011 | 36 | 11 | 52 | 011 | 16 |
| 100 | 40 | | | 100 | 24 |
| 101 | 44 | | | 101 | 36 |
| 110 | 48 | | | 110 | 44 |
| 111 | 52 | | | 111 | 52 |

ENCODING APPARATUS, DECODING APPARATUS, DECODING METHOD, RECORDING APPARATUS, RECORDING METHOD, REPRODUCING APPARATUS, REPRODUCING METHOD, AND RECORD MEDIUM

BACKGROUND OF THE INVENTION

1. Field of the Invention

The present invention relates to an encoding apparatus, an encoding method, a decoding apparatus, a decoding method, a recording apparatus, a recording method, a reproducing apparatus, and a reproducing method for processing a signal of for example audio data. The present invention also relates to a record medium for recording audio data and so forth.

2. Description of the Related Art

As a related art reference of a highly efficiently encoding method for an audio signal, for example, a transform encoding method is known. The transform encoding method is one example of a block-segmentation frequency band dividing method. In the transform encoding method, a time-base audio signal is segmented into blocks at intervals of a predetermined unit time period. The time-base signal of each block is converted into a frequency-base signal (namely, orthogonally transformed). Thus, the time-base signal is divided into a plurality of frequency bands. In each frequency band, blocks are encoded. As another related art reference, a sub band coding (SBC) method as an example of a non-block-segmentation frequency band dividing method is known. In the SBC method, a time-base audio signal is divided into a plurality of frequency bands and then encoded without segmenting the signal into blocks at intervals of a predetermined unit time period.

As another related art reference, a highly efficiently encoding method that is a combination of the band division encoding method and the SBC method is also known. In this highly efficiently encoding method, a signal of each sub band is orthogonally transformed into a frequency-base signal corresponding to the transform encoding method. The transformed signal is encoded in each sub band.

As an example of a band dividing filter used for the above-described sub band coding method, for example a QMF (Quadrature Mirror Filter) is known. The QMF is described in for example R. E. Crochiere "Digital coding of speech in sub bands" Bell Syst. Tech. J. Vol. 55. No. 8 (1976). An equal band width filter dividing method for a poly-phase quadrature filter and an apparatus thereof are described in ICASSP 83, BOSTON "Polyphase Quadrature filters—A new sub band coding technique", Joseph H. Rothwiler.

As an example of the orthogonal transform method, an input audio signal is segmented into blocks at intervals of a predetermined unit time period (for each frame). Each block is transformed by for example a fast Fourier transforming (FFT) method, a discrete cosine transforming (DCT) method, or a modified DCT transforming (MDCT) method. As a result, a time-base signal is converted into a frequency-base signal. The MDCT is described in for example ICASSP 1987, "Sub band/Transform coding Using Filter Bank Designs Based on Time Domain Aliasing Cancellation", J. P. Princen and A. B. Bradley, Univ. of Surrey Royal Melbourne Inst. of Tech.

On the other hand, an encoding method that uses a frequency division width in consideration of the hearing characteristics of humans for quantizing each sub band frequency component is known. In other words, so-called critical bands of which their band widths are proportional to their frequencies have been widely used. With the critical bands, an audio signal may be divided into a plurality of sub bands (for example, 25 sub bands). According to such a sub band coding method, when data of each sub band is encoded, a predetermined number of bits is allocated for each sub band. Alternatively, an adaptive number of bits is allocated for each sub band. For example, when MDCT coefficient data generated by the MDCT process is encoded with the above-described bit allocating method, an adaptive number of bits is allocated to the MDCT coefficient data of each block of each sub band. With the allocated bits, each block is encoded.

An example of a related art reference of such a bit allocating method and an apparatus corresponding thereto is described as "a method for allocating bits corresponding to the strength of a signal of each sub band" in IEEE Transactions of Acoustics, Speech, and Signal Processing, vol. ASSP-25, NO. 4, August (1977). As another related art reference, "a method for fixedly allocating bits corresponding to a signal to noise ratio for each sub band using a masking of the sense of hearing" is described in ICASP, 1980, "The critical band coder—digital encoding of the perceptual requirements of the auditory system", M. A. Kransner MIT.

When each block is encoded for each sub band, each block is normalized and quantized for each sub band. Thus, each block is effectively encoded. This process is referred to as block floating process. When MDCT coefficient data generated by the MDCT process is encoded, the maximum value of the absolute values of the MDCT coefficients is obtained for each sub band.

Corresponding to the maximum value, the MDCT coefficient data is normalized and then quantized.

Thus, the MDCT coefficient data can be more effectively encoded. The normalizing process can be performed as follows. From a plurality of numbered values, a value used for the normalizing process is selected for each block using a predetermined calculating process. The number assigned to the selected value is used as normalization information. The plurality of values are numbered so that they increment by 2 dB of an audio level.

The above-described highly effectively encoded signal is decoded as follows. With reference to the bit allocation information, the normalization information, and so forth for each sub band, MDCT coefficient data is generated corresponding to a signal that has been highly efficiently encoded. Since a so-called inversely orthogonally transforming process is performed corresponding to the MDCT coefficient data, time-base data is generated. When the highly efficiently encoding process is performed, if the frequency band is divided into sub bands by a band dividing filter, the time-base data is combined using a sub band combining filter.

When numbered normalization information is changed by an adding process, a subtracting process, or the like, a reproduction level adjusting function, a filtering function, and so forth can be accomplished for a time-base signal of which a highly efficiently encoded data has been decoded. According to this method, since the reproduction level can be adjusted by a calculating process such as an adding process or a subtracting process, the structure of the apparatus becomes simple. In addition, since a decoding process, an encoding process, and so forth are not excessively required, the reproduction level can be adjusted without a deterioration of the signal quality. In addition, in this method, even if a highly efficiently encoded signal is changed, since the time period of the decoded signal does not vary, when numbered normalization information is changed, part of the signal generated by the decoding process can be changed.

In the reproduction level adjusting process and the filtering process that can be accomplished by changing normalization information of the highly efficiently encoded information, unless any special device is disposed, a predetermined function is performed at a designated time period. Thus, the functions are restricted. For example, in the reproduction level adjusting function, the same reproduction level is kept at a designated predetermined time period. On the other hand, in the filtering function, the same function is performed at a designated time period.

OBJECTS AND SUMMARY OF THE INVENTION

Therefore, an object of the present invention is to provide an encoding apparatus, an encoding method, a decoding apparatus, a decoding method, a recording apparatus, a recording method, a reproducing apparatus, and a reproducing method that accomplish various functions corresponding to a change of normalization information. Another object of the present invention is to provide a record medium for recording changed normalization information.

A first aspect of the present invention is an encoding apparatus for highly efficiently encoding an input digital signal, comprising a band dividing means for dividing the input digital signal into a plurality of frequency band components, an encoding means for block-segmenting a sequence of samples arranged in a time-base direction and/or a frequency-base direction of the input digital signal divided in the plurality of frequency band components and encoding each block, a normalization processing means for normalizing a signal component of each block encoded by the encoding means and generating normalization signal, a quantization coefficient calculating means for calculating quantization coefficients that represent a feature of the signal component of each block, a bit allocating means for deciding the number of allocated bits for each block corresponding to the quantization coefficients calculated by the quantization coefficient calculating means, a normalization information changing means for gradually changing the normalization information generated by the normalization processing means corresponding to a user's operation on a time base, and an encoded data generating means for re-quantizing the signal component of each block corresponding to the normalization information changed by the normalization information changing means and the number of allocated bits allocated by the bit allocating means and generating encoded data corresponding to a predetermined format.

A second aspect of the present invention is a decoding apparatus for decoding a digital signal that has been highly efficiently encoded, comprising a normalization information changing means for changing normalization information contained in encoded data that is input corresponding to a user's operation, a bit allocation decoding means for deallocating allocated bits corresponding to the normalization information changed by the normalization information changing means and to bit allocation information contained in the input encoded data, a plurality of decoding means for decoding an output signal deallocated by the bit allocation decoding means into a time-base sample sequence corresponding to block size information contained in the encoded data for each frequency band component, and a filtering means for combining signals of all the frequency band components that are output from the plurality of decoding means and generating a decoded signal of all the frequency band.

A third aspect of the present invention is a recording apparatus for highly efficiently encoding an input digital signal and recording the encoded signal to a record medium, comprising a band dividing means for dividing the input digital signal into a plurality of frequency band components, an encoding means for block-segmenting a sequence of samples arranged in a time-base direction and/or a frequency-base direction of the input digital signal divided in the plurality of frequency band components and encoding each block, a normalization processing means for normalizing a signal component of each block encoded by the encoding means and generating normalization signal, a quantization coefficient calculating means for calculating quantization coefficients that represent a feature of the signal component of each block, a bit allocating means for deciding the number of allocated bits for each block corresponding to the quantization coefficients calculated by the quantization coefficient calculating means, a normalization information changing means for gradually changing the normalization information generated by the normalization processing means corresponding to a user's operation on a time base, an encoded data generating means for re-quantizing the signal component of each block corresponding to the normalization information changed by the normalization information changing means and the number of allocated bits allocated by the bit allocating means and generating encoded data corresponding to a predetermined format, and a recording means for recording encoded data generated by the encoded data generating means to the record medium.

A fourth aspect of the present invention is a reproducing apparatus for reproducing a digital signal that has been highly efficiently encoded from a record medium, comprising a reproducing means for reproducing the highly efficiently encoded digital signal from the record medium, a normalization information changing means for changing normalization information contained in encoded data that is input corresponding to a user's operation, a bit allocation decoding means for deallocating allocated bits corresponding to the normalization information changed by the normalization information changing means and to bit allocation information contained in the digital signal reproduced by the reproducing means, a plurality of decoding means for decoding an output signal deallocated by the bit allocation decoding means into a time-base sample sequence corresponding to block size information contained in the encoded data for each frequency band component, and a filtering means for combining signals of all the frequency band components that are output from the plurality of decoding means and generating a decoded signal of all the frequency band.

A fifth aspect of the present invention is a record medium for recording encoded data generated by the steps of (a) dividing the input digital signal into a plurality of frequency band components, (b) block-segmenting a sequence of samples arranged in a time-base direction and/or a frequency-base direction of the input digital signal divided in the plurality of frequency band components and encoding each block, (c) normalizing a signal component of each block encoded at step (b) and generating normalization signal, (d) calculating quantization coefficients that represent a feature of the signal component of each block, (e) deciding the number of allocated bits for each block corresponding to the quantization coefficients calculated at step (d), (f) gradually changing the normalization information generated at step (c) corresponding to a user's operation on a time base, and (g) re-quantizing the signal component of each block corresponding to the normalization information changed at step (f) and the number of allocated bits allocated at step (e) and generating encoded data corresponding to a predetermined format.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a schematic diagram showing the data structure of encoded unit block data;

FIG. 4 is a schematic diagram showing the data structure of number of unit blocks and dually written data contained in unit block data shown in FIG. 3;

DETAILED DESCRIPTION OF THE PREFERRED EMBODIMENTS

Figure 1:
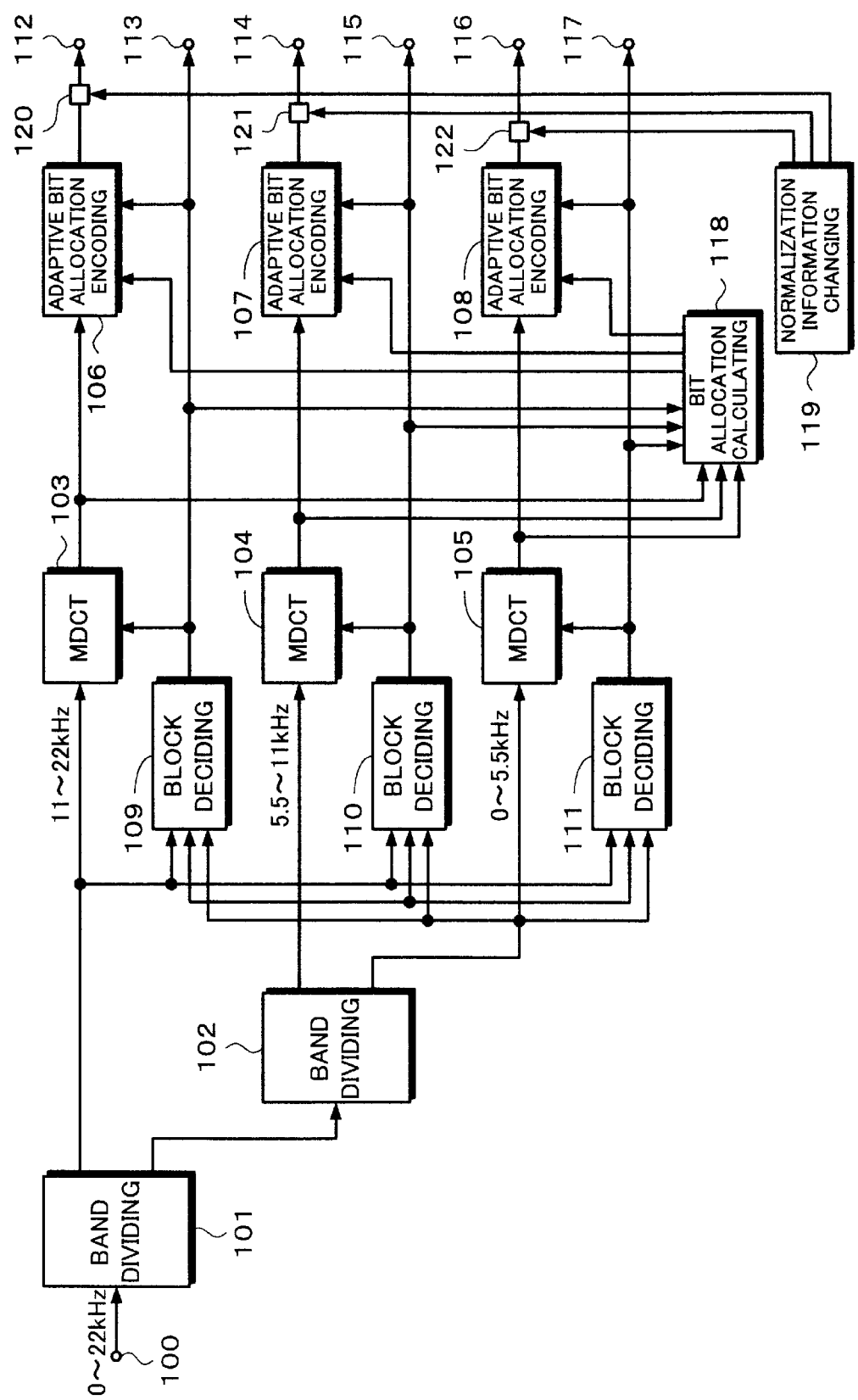
FIG. 1 is a block diagram showing an encoding circuit that performs a highly efficiently encoding process according to the present invention.

FIG. 1 shows an example of the structure of a first embodiment of the present invention. According to the first embodiment, the present invention is applied to an encoding apparatus that highly efficiently encodes an input digital signal such as an audio PCM (Pulse Code Modulation) signal using a sub band coding (SBC) process, an adaptive transfer coding (ATC) process, and an adaptive bit allocating process. When the sampling frequency is 44.1 kHz, an audio PCM signal with a frequency band of 0 to 2 kHz is supplied to a band dividing filter 101 through an input terminal 100. The band dividing filter 101 divides the supplied signal into a signal with a sub band of 0 to 11 kHz and a signal with a sub band of 11 kHz to 22 kHz. The signal with the sub band of 11 to 22 kHz is supplied to an MDCT (Modified Discrete Cosine Transform) circuit 103 and block designating circuits 109, 110, and 111.

The signal with the sub band of 0 kHz to 11 kHz is supplied to a band dividing filter 102. The band dividing filter 102 divides the supplied signal into a signal with a sub band of 5.5 kHz to 11 kHz and a signal with a sub band of 0 to 5.5 kHz. The signal with the sub band of 5.5 to 11 kHz is supplied to an MDCT circuit 104 and the block designating circuits 109, 110, and 111. On the other hand, the signal with the sub band of 0 to 5.5 kHz is supplied to an MDCT circuit 105 and the block designating circuits 109, 110, and 111. Each of the band dividing filters 101 and 102 can be composed of a QFM filter or the like. The block designating circuit 109 designates the block size corresponding to the supplied signal. Information that represents the designated block size is supplied to the MDCT circuit 103, an adaptive bit allocation encoding circuit 106, and an output terminal 113.

The block designating circuit 110 designates the block size corresponding to the supplied signal. Information that represents the designated block size is supplied to the MDCT circuit 104, an adaptive bit allocation encoding circuit 107, and an output terminal 115. The block designating circuit 111 designates the block size corresponding to the supplied signal. Information that represents the designated block size is supplied to the MDCT circuit 105, an adaptive bit allocation encoding circuit 108, and an output terminal 117. The block designating circuits 109, 110, and 111 cause the block size to be adaptively changed corresponding to the input data before the orthogonally transforming process is performed.

FIGS. 2A, 2B, 2C, and 2D show examples of data of individual sub bands supplied to the MDCT circuits 103, 104, and 105. The block designating circuits 109, 110, and 111 independently designate the sizes of orthogonally transformed blocks of individual sub bands that are output from the band dividing filters 101 and 102. In addition, the MDCT circuits 103, 104, and 105 can change time resolutions corresponding to time characteristics and frequency distributions of the signals. When the input signal is chronologically semi-steady, a long mode of which the size of each orthogonally transformed block is for example 11.6 ms is used.

Figure 2B:
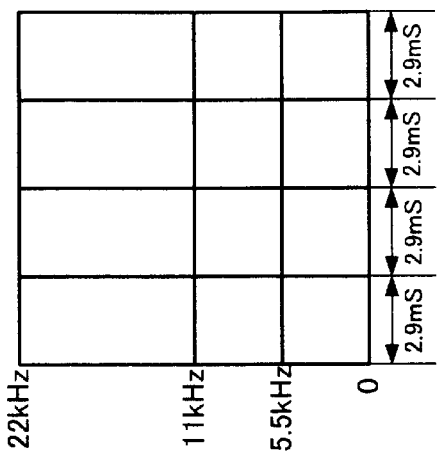
FIG. 2B is a graph showing an orthogonally transformed block size in a short mode.
Figure 2D:
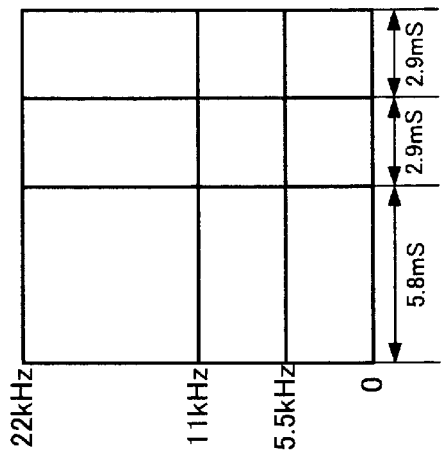
FIG. 2D is a graph showing an orthogonally transformed block size in a middle mode—B.
Figure 2A:
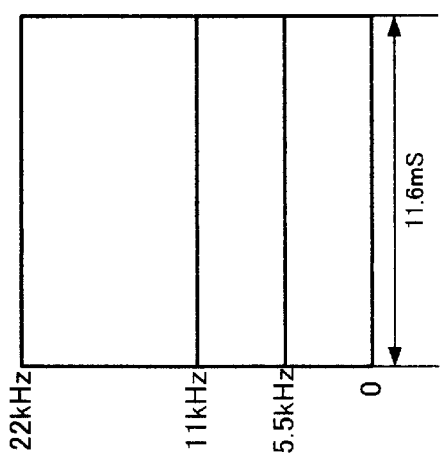
FIG. 2A is a graph showing an orthogonally transformed block size in a long mode.
Figure 2C:
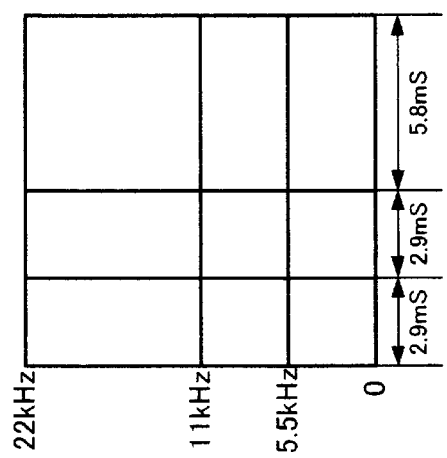
FIG. 2C is a graph showing an orthogonally transformed block size in a middle mode—A.

On the other hand, when the input signal is non-steady, one of modes of which the size of each orthogonally transformed block is ½ or ¼ of the size of each orthogonally transformed block of the long mode is used. In reality, in a short mode, the size of each orthogonally transformed block is ¼ of the size of each orthogonally transformed block of the long mode. Thus, in the short mode, the size of each orthogonally transformed block is 2.9 ms as shown in FIG. 2B. There are two middle modes that are a middle mode a and a middle mode b. In the middle mode a, the size of one orthogonally transformed block is ½ of the size of each orthogonally transformed block of the long mode and the size of another orthogonally transformed block is ¼ of the size of each orthogonally transformed block of the long mode. Thus, in the middle mode a, the size of one orthogonally transformed block is 5.8 ms and the size of another orthogonally transformed block is 2.9 ms as shown in FIG. 2C. In the middle mode b, the size of one orthogonally transformed block is ¼ of the size of each orthogonally transformed block of the long mode and the size of another orthogonally transformed block is ½ of the size of each orthogonally transformed block of the long block. Thus, in the middle mode b, the size of one orthogonally transformed block is 2.9 ms and the size of another orthogonally transformed block is 5.8 ms as shown in FIG. 2D. With such various time resolutions, complicated input signals can be handled.

When the circuit scale of the apparatus is not restricted, size of each orthogonally transformed block can be divided in more complicated manners. Thus, it is clear that real input signals can be more adequately processed. The block size is designated by the block designating circuits 109, 110, and 111. Information that represents the designated block size is supplied to the MDCT circuits 103, 104, and 105, a bit allocation calculating circuit 118, and the output terminals 113, 115, and 117.

Returning to FIG. 1, the MDCT circuit 103 performs the MDCT process corresponding to the block size designated by the block designating circuit 109. High band MDCT coefficient data or frequency-base spectrum data that is generated by such a process is combined for each critical band and supplied to the adaptive bit allocation encoding circuit 106 and the bit allocation calculating circuit 118. The MDCT circuit 104 performs the MDCT process corresponding to the block size designated by the block designating circuit 110. Middle band MDCT coefficient data or frequency-base spectrum data generated by such a process is supplied to the adaptive bit allocation encoding circuit 107 and the bit allocation calculating circuit 118 after the critical band width thereof is divided in consideration of the effectiveness of the block floating process.

The MDCT circuit 105 performs the MDCT process corresponding to the block size designated by the block designating circuit 111. As the result of the process, low band MDCT coefficient data or frequency-base spectrum data is combined for each critical band and then supplied to the adaptive bit allocation encoding circuit 108 and the bit allocation calculating circuit 118. The critical bands are frequency bands that are divided in consideration of the hearing characteristics of humans. When a particular pure sound is masked with a narrow band noise that has the same strength thereof and that is in the vicinity of the frequency band of the pure sound, the band of the narrow band noise is a critical band.

The band widths of the critical bands are proportional to their frequencies. The frequency band of 0 to 22 kHz is divided into for example 25 critical bands.

The bit allocation calculating circuit 118 calculates for example the masking amount, energy, and/or peak value for each sub band in consideration of the above-described critical bands and block floating for a masking effect (that will be described later) corresponding to the supplied MDCT coefficient data or frequency-base spectrum data and block size information. Corresponding to the calculated results, the bit allocation calculating circuit 118 calculates the scale factor and the number of allocated bits for each sub band. The calculated number of allocated bits is supplied to the adaptive bit allocation encoding circuits 106, 107, and 108. In the following description, each sub band as a bit allocation unit is referred to as unit block.

The adaptive bit allocation encoding circuit 106 re-quantizes the spectrum data or MDGT coefficient data supplied from the MDCT circuit 103 corresponding to the block size information supplied from the block designating circuit 109 and to the number of allocated bits and the scale factor information supplied from the bit allocation calculating circuit 118. As the result of the process, the adaptive bit allocation encoding circuit 106 generates encoded data corresponding to the applied encoding format. The encoded data is supplied to a calculating device 120. The adaptive bit allocation encoding circuit 107 re-quantizes the spectrum data or MDCT coefficient data supplied from the MDCT circuit 104 corresponding to the block size information supplied from the block designating circuit 110 and to the number of allocated bits and scale factor information supplied from the bit allocation calculating circuit 118. As the result of the process, encoded data corresponding to the applied encoding format is generated. The encoded data is supplied to a calculating device 121.

The adaptive bit allocation encoding circuit 108 re-quantizes the spectrum data or MDCT coefficient data supplied from the MDCT circuit 105 corresponding to the block size information supplied from the block designating circuit 110 and to the number of allocated bits and scale factor information supplied from the bit allocation calculating circuit 118. As the result of the process, encoded data corresponding to the applied encoding format is generated. The encoded data is supplied to a calculating device 122.

According to the first embodiment and a second embodiment (that will be described later), as normalization information (namely, information that represents the block floating state of each unit block), scale factor information is used. However, it should be noted that depending on the applied encoding method the normalization information may be other than scale factor information. In such a case, the present invention can be applied.

FIG. 3 shows an example of the format of encoded data. In FIG. 3, numeric values 0, 1, 2, . . . , 211 on the left side represent bytes. In this example, one frame is composed of 212 bytes. At the 0-th byte position, block size information of each sub band designated by the block designating circuits 109, 110, and 111 shown in FIG. 1 is placed. At the first byte position, information that represents the number of unit blocks is placed. In the high band, the probability of which no bits are allocated to unit blocks by the bit allocation calculating circuit 118 and thereby they are not recorded becomes high. Thus, to deal with such a situation, the number of unit blocks is designated in such a manner that more bits are allocated to the middle band region and the low band region that largely affect the sense of hearing than the high band region. In addition, at the first byte position, the number of unit blocks in which bit allocation information is dually written and the number of unit blocks in which scale factor information is dually written are placed.

To correct an error, the same information is dually written. In other words, data recorded at a particular byte is dually recorded to another byte. Although the strength against an error is proportional to the amount of data that is dually written, the amount of data used for spectrum data decreases. In the example of the encoding format, since the number of unit blocks in which bit allocation information is dually written and the number of unit blocks in which scale factor information is dually written are independently designated, the strength against an error and the number of bits used for spectrum data can be optimized. The relation between a code in a predetermined bit and the number of unit blocks has been defined as a format.

FIG. 4 shows an example of contents of eight bits of the first byte. In this example, the first three bits represent the number of contained unit blocks. The next two bits represent the number of unit blocks to which the bit allocation information is dually written. The last three bits represent the number of unit blocks unit blocks to which the scale factor information is dually written.

At the second byte position shown in FIG. 3, the bit allocation information of each unit block is placed. One unit block is composed of for example four bites. Thus, the bit allocation information for the number of unit blocks starting with 0-th unit block is placed. The bit allocation information is followed by scale factor information of each unit block. For the scale factor information, each unit block is composed of for example six bits. Thus, the scale factor information for the number of unit blocks starting with the 0-th unit block is placed.

The scale factor information is followed by spectrum data of each unit block. The spectrum data for the number of unit blocks that are really contained is placed. Since the data amount of spectrum data contained in each unit block has been defined as a format, with the bit allocation information, the relation of data can be obtained. When the number of bits allocated to a particular unit block is zero, the unit block is not contained.

The spectrum information is followed by the scale factor that is dually written and the bit allocation information that is dually written. The scale factor information and the bit allocation information are dually written corresponding to the dual write information shown in FIG. 4. At the last byte (211-st byte) and the second last byte (210-th byte), information at the 0-th byte and information at the first byte are dually written. The two bytes in which such information is dually written has been defined as a format. However, scale factor information that is dually written and the bit allocation information that is dually written cannot be changed.

One frame contains 1024 PCM samples that are supplied through the input terminal 100. The first 512 samples are used in the immediately preceding frame. The last 512 samples are used in the immediately following frame. This arrangement is used from a view point of an overlap of the MDCT process.

Returning to FIG. 1, a normalization information changing circuit 119 generates values for changing scale factor information for a low band, a middle band, and a high band and supplies the values corresponding to the low band, the middle band, and the high band to the calculating devices 120, 121, and 122, respectively. The calculating device 120 adds the value supplied from the normalization information changing circuit 119 to the scale factor information contained in the encoded data supplied from the adaptive bit allocation encoding circuit 106. When the value that is output from the normalization information changing circuit 119 is negative, the calculating device 120 operates as a subtracting device. The calculating device 121 adds the value supplied from the normalization information changing circuit 119 to the scale factor information contained in the encoded data supplied from the adaptive bit allocation encoding circuit 107. When the value that is output from the normalization information changing circuit 119 is negative, the calculating device 121 operates as a subtracting device.

The calculating device 122 adds the value supplied from the normalization information changing circuit 119 to the scale factor information contained in the encoded data supplied from the adaptive bit allocation encoding circuit 108. When the value that is output from the normalization information changing circuit 119 is negative, the calculating device 122 operates as a subtracting device. The calculating devices 120, 121, and 122 output the values to output terminals 112, 114, and 116, respectively. The normalization information changing circuit 119 operates corresponding to an operation of the user through for example an operation panel. In this case, the level adjusting process, the filtering process, and so forth that the user desires are accomplished.

Figure 5:
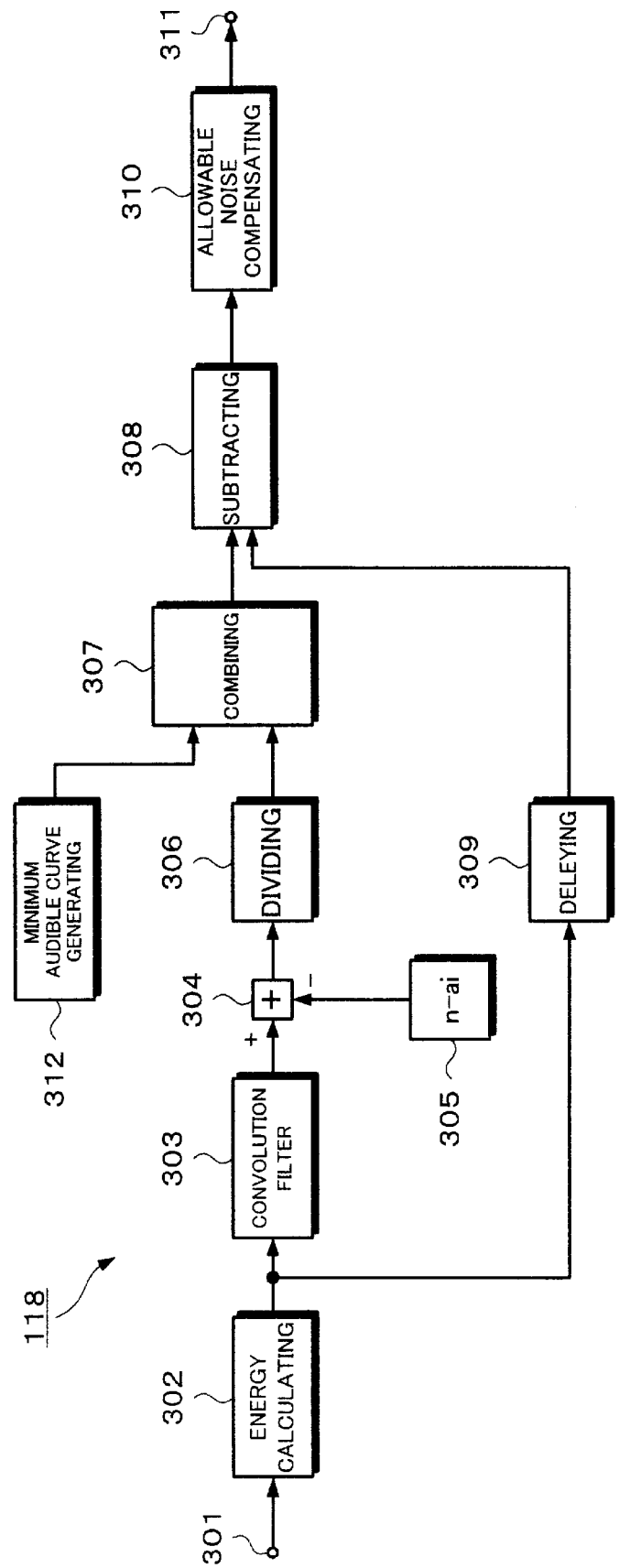
FIG. 5 is a block diagram showing the structure of a bit allocation calculating circuit shown in FIG. 1.

Next, each process will be described in detail. FIG. 5 shows an example of the structure of the bit allocation calculating circuit 118. Frequency-base spectrum data or MDCT coefficients supplied from the MDCT circuits 103, 104, and 105 through an input terminal 301 is supplied to an energy calculating circuit 302. In addition, block size information is supplied from the block designating circuits 109, 110, and 111 through the input terminal 301 to the energy calculating circuit 302. The energy calculating circuit 302 calculates the sum of the amplitude values of each unit block so as to calculate the energy of each unit block.

Figure 6:
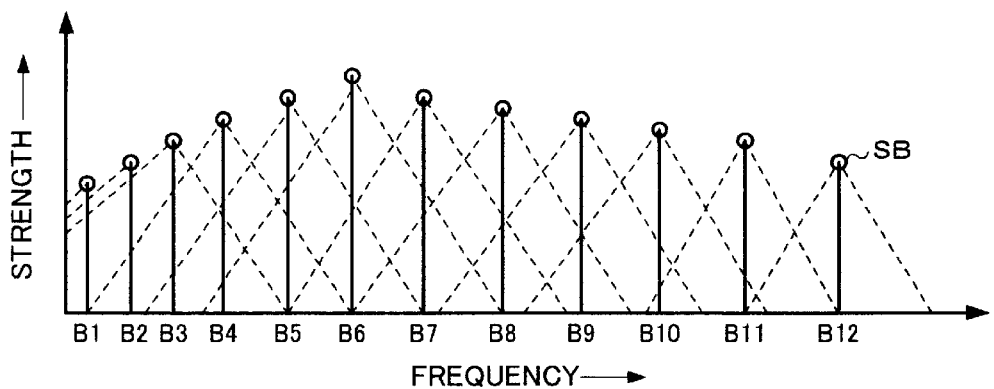
FIG. 6 is a graph showing a frequency characteristic of an output signal of an energy calculating circuit shown in FIG. 5.

FIG. 6 shows an example of an output signal of the energy calculating circuit 302. In FIG. 6, a spectrum SB of the sum of each sub band is represented by a vertical line with a circle. In FIG. 6, the horizontal axis and the vertical axis represent the frequency and signal strength, respectively. For simplicity, in FIG. 6, only a spectrum B12 is denoted by "SB". The number of sub bands (unit blocks) is 12 (B1 to B12). Instead of the energy calculating circuit 302, a structural portion that calculates the peak value, average value, and so forth of amplitude values and performs a bit allocating process corresponding to the peak value, average value, and so forth of the amplitude values may be disposed.

The energy calculating circuit 302 designates a scale factor value. In reality, several positive values are provided as alternatives of a scale factor value. Among them, values that are larger than the maximum value of absolute values of spectrum data or MDCT coefficients of each unit block are selected. The minimum value of the selected values is used as a scale factor value of the unit block. Numbers are allocated to the alternatives of a scale factor value using for example several bits. The allocated numbers are stored in for example ROM (Read Only Memory) (not shown). At this point, the alternatives of a scale factor value increment by for example 2 dB. A number allocated to a scale factor value selected for a particular unit block is defined as scale factor information of the particular unit block.

An output signal (namely, each value of the spectrum SB) of the energy calculating circuit 302 is supplied to a convolution filter circuit 303. The convolution filter circuit 303 performs a convoluting process for multiplying a predetermined weighting function by a spectrum SB and adding them so as to consider the influence of the masking of the spectrum SB. Next, with reference to FIG. 6, the convoluting process will be described in detail. As was described above, FIG. 6 shows an example of a spectrum SB of each block. In the convoluting process of the convolution filter circuit 303, the sum of portions denoted by dotted lines is calculated. The convolution filter circuit 303 can be composed of a plurality of delaying devices, a plurality of multiplying devices, and a sum adding device. Each of the delaying devices successively delays the input data. Each of the multiplying devices multiplies output data of a relevant delaying device by a filter coefficient (weighting function). The sum adding device adds the output data of the multiplying devices.

Returning to FIG. 5, an output signal of the convolution filter circuit 303 is supplied to a calculating device 304. An allowance function (that represents a masking level) is supplied from an (n−ai) function generating circuit 305 to the calculating device 304. The calculating device 304 calculates a level a corresponding to an allowable noise level in an area convoluted by the convolution filter circuit 303 with the allowance function. As will be described later, the level a corresponding to the allowable noise level is an allowable level of each critical band as a result of an inversely convoluting process. The calculated value of the level α is controlled by increasing/decreasing the allowance function.

In other words, when the numbers allocated from the lowest critical band are denoted by i, the level a corresponding to the allowable noise level can be obtained by the following formula (1).

$$\alpha = S - (n - ai) \quad (1)$$

wherein n and α are constants; a>0; S is the strength of a convoluted spectrum. In formula (1), (n−ai) is an allowance function. In this example, n=38 and a=1 are given.

The level α calculated by the calculating device 304 is supplied to a dividing device 306. The dividing device 306 inversely convolutes the level α. As a result, the dividing device 306 generates a masking spectrum corresponding to the level α. The masking spectrum is an allowable noise spectrum. When the inversely convoluting process is performed, complicated calculations are required. However, according to the first embodiment of the present invention, with the dividing device 306 that is simply structured, the inversely convoluting process is performed. The masking spectrum is supplied to a combining circuit 307. In addition, data that represents a minimum audible curve RC (that will be described later) is supplied from a minimum audible curve generating circuit 312 to the combining circuit 307.

The combining circuit 307 combines the masking spectrum that is output from the dividing device 306 and the data that represents the minimum audible curve RC and generates a masking spectrum. The generated masking spectrum is supplied to a subtracting device 308. The timing of an output signal of the energy calculating circuit 302 (namely, the spectrum SB of each sub band) is adjusted by a delaying circuit 309. The resultant signal is supplied to the subtracting device 308. The subtracting device 308 performs a subtracting process corresponding to the masking spectrum and the spectrum SB.

Figure 7:
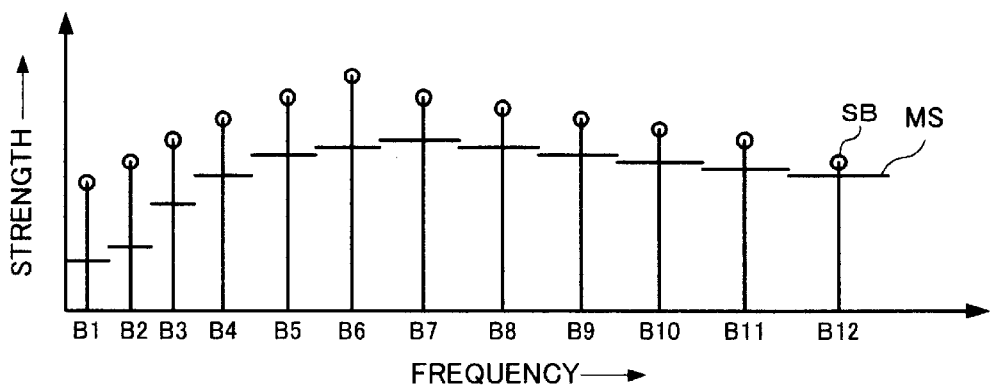
FIG. 7 is a graph showing a frequency characteristic of an output signal of a convolution filter circuit shown in FIG. 5.

As the result of the process, the spectrum SB of each block is masked so that the portion that is smaller than the level of the masking spectrum is masked. FIG. 7 shows an example of the masking process. Referring to FIG. 7, the portion that is smaller than the level of the masking spectrum (denoted by MS) of the spectrum SB is masked. For simplicity, in FIG. 7, only the spectrum B12 is denoted by "SB" and the level of the masking spectrum is denoted by "MS".

When the noise absolute level is equal to or smaller than the minimum audible curve RC, the noise is inaudible for humans. The minimum audible curve varies corresponding to the reproduction volume even in the same encoding method. However, in a real digital system, music data in for example a 16-bit dynamic range does not largely vary. Thus, assuming that the quantizing noise of the most audible frequency band at around 4 kHz is inaudible, it is supposed that the quantizing noise that is smaller than the level of the minimum audible curve is inaudible in other frequency bands.

Figure 8:
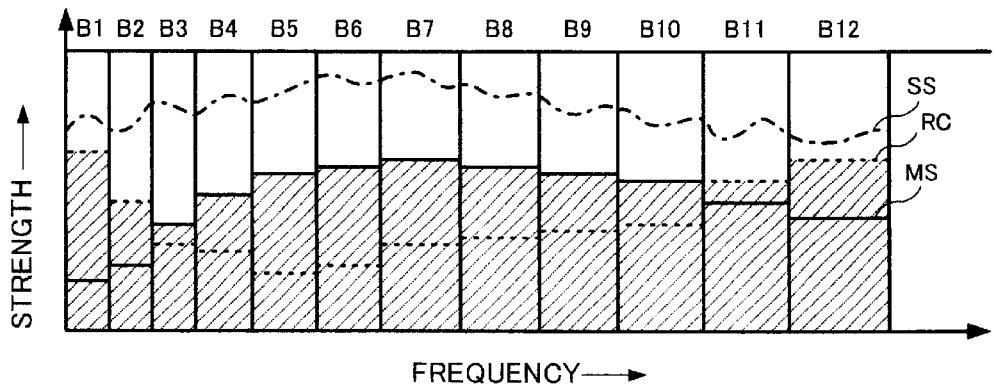
FIG. 8 is a graph showing a frequency characteristic of an output signal of an allowable noise compensating circuit shown in FIG. 5.

Thus, when noise at around 4 kHz of a word length of the system is prevented from being audible, if the allowable noise level is obtained by combining the minimum audible curve RC and the masking spectrum MS, the allowable noise level can be represented as a hatched portion shown in FIG. 8. In this example, the level at 4 kHz of the minimum audible curve is set to the minimum level equivalent to for example 20 bits. In FIG. 8, SB of each block is denoted by a solid line, whereas MS of each block is denoted by a dotted line. However, in FIG. 8, for simplicity, only the spectrum B12 is represented with "SB", "MS", and "RC". In FIG. 8, a signal spectrum SS is denoted by a dashed line.

Returning to FIG. 5, an output signal of the subtracting device 308 is supplied to an allowable noise compensating circuit 310. The allowable noise compensating circuit 310 compensates the allowable noise level of the output signal of the subtracting device 308 corresponding to for example data of an equal roundness curve. In other words, the allowable noise compensating circuit 310 calculates allocated bits for each unit block corresponding to various parameters such as the above-described masking and hearing characteristic. An output signal of the allowable noise compensating circuit 310 is obtained as the final output data of the bit allocation calculating circuit 118 through an output terminal 311. In this example, the equal roundness curve is a characteristic curve that represents the hearing characteristic of humans. For example, the sound pressure of a sound at each frequency that is heard with the same strength of a pure sound at 1 kHz is plotted. The potted points are connected and represented as a curve. This curve is referred to as roundness equal sensitivity curve.

The equal roundness curve matches the minimum audible curve shown in FIG. 8. On the equal roundness curve, although the sound pressure at around 4 kHz is smaller than that at 1 kHz by 8 to 10 dB, the strength at 4 kHz is the same as that at 1 kHz. In contrast, unless the sound pressure at 50 Hz is larger than that at 1 kHz by around 15 dB, the strength at 50 Hz is not the same as that at 1 kHz. Thus, when noise that exceeds the level of the minimum audible curve RC (namely, the allowable noise level) has a frequency characteristic corresponding to the equal roundness curve, the noise can be prevented from being audible to humans. Thus, it is clear that in consideration of the equal roundness curve, the allowable noise level can be compensated corresponding to the hearing characteristics of humans.

Next, scale factor information will be described in detail. As alternatives of a scale factor value, a plurality of positive values (for example, 63 positive values) are stored in for example a memory of the bit allocation calculating circuit

118. Values that exceed the maximum value of the absolute values of the spectrum data or MDCT coefficients of a particular unit block are selected from the alternatives. The minimum value of the selected values is used as the scale factor value of the particular unit block. A number allocated to the selected scale factor value is defined as scale factor information of the particular unit block. The scale factor information is contained in the encoded data. The positive values as the alternatives of a scale factor value are allocated with numbers of six bits. The positive values increment by 2 dB.

When the scale factor information is controlled with an adding operation and a subtracting operation, the level of the reproduced audio data can be adjusted with an increment of 2 dB. For example, when the same values that are output from the normalization information changing circuit 119 are added or subtracted to/from the scale factor information of all the unit blocks, the levels of all the unit blocks can be adjusted by 2 dB. The scale factor information generated as the result of the adding/subtracting operations is limited to the range defined in the applied format.

Alternatively, when different values that are output from the normalization information changing circuit 119 are added or subtracted to/from the scale factor information of the respective unit blocks, the levels of the unit blocks can be separately adjusted. As a result, a filtering function can be accomplished. In more reality, when the normalization information changing circuit 119 outputs a pair of a unit block number and a value to be added or subtracted to/from the scale factor information of the unit block, unit blocks and values to be added or subtracted to/from scale factor information of the unit blocks are correlated.

By changing the above-described scale factor information, the same functions as those of the second embodiment of the present invention (that will be described later with reference to FIGS. 10 to 14) can be accomplished. In the first embodiment of the present invention, with the band dividing method using the QMF filter and the encoding method using the MDCT orthogonal transforming process, the above-described functions are accomplished. However, it should be noted that the band dividing method and the encoding method are not limited to the above-described QMF and MDCT, respectively. In other words, as long as a quantizing process is performed with normalization information and bit allocation information, even if a sub band coding process is performed with for example a filter bank, the same functions as those of the first embodiment can be accomplished.

When a processing system that records a signal to a disc type record medium (for example, a magnetic disc or a magneto optical disc), a tape type record medium (for example, a magnetic tape or an optical tape), or a semiconductor record medium (for example, an IC memory, a memory stick, or a memory card) is disposed downstream of the apparatus according to the first embodiment, a recording apparatus that allows a change of scale factor information to be reflected to record data can be accomplished. When a change of scale factor information is reflected to the record data, a record medium having a reproduction level adjusting function and a fading function can be accomplished.

When a processing system that transmits a signal through a wireless transmission path (for example, radio wave or light (infrared ray)) or a wired transmission path (for example, a wire cable or an optical cable) is disposed downstream of the apparatus according to the first embodiment, a transmitting apparatus that reflects a change of scale factor information to transmission data can be accomplished.

Figure 9:
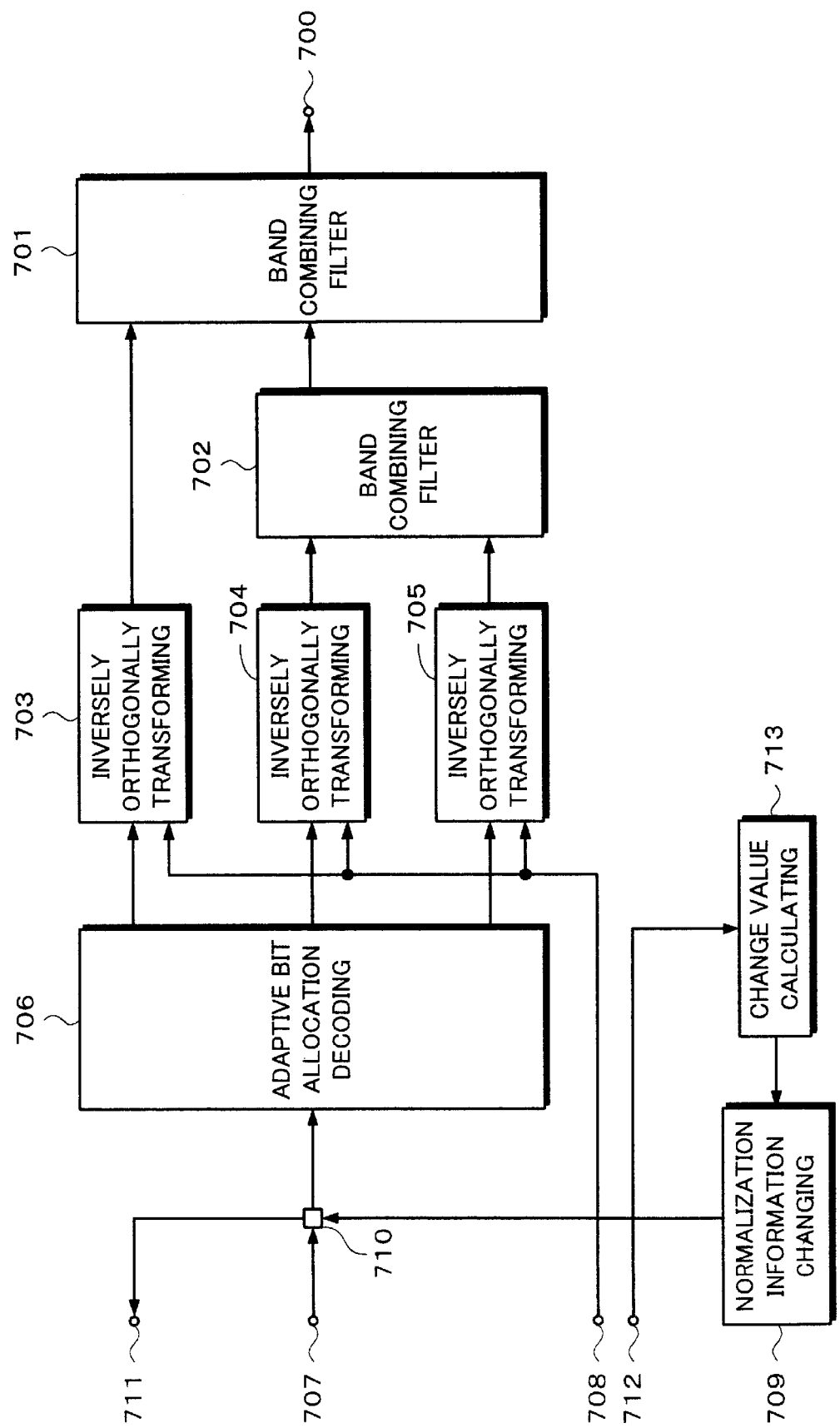
FIG. 9 is a block diagram showing the structure of a decoding circuit that decodes a signal that is encoded by the encoding circuit shown in FIG. 1.

Next, the second embodiment of the present invention will be described. In the second embodiment, the present invention is applied to a decoding apparatus that decodes encoded data that has been encoded corresponding to the above-described encoding method. FIG. 9 shows an example of the structure of the decoding apparatus according to the second embodiment of the present invention. Encoded data that is reproduced from a record medium such as a magneto optical disc is supplied to an input terminal 707. Block size information used in the encoding process (namely, data equivalent to output signals of the output terminals 113, 115, and 117 is supplied to an input terminal 708. A time unit of highly efficiently encoded information is supplied to the decoding apparatus through an input terminal 712.

The encoded data is supplied from the input terminal 707 to a calculating device 710. The calculating device 710 also receives numeric data from a normalization information changing circuit 709. The calculating device 710 adds the numeral data supplied from the normalization information changing circuit 709 to the scale factor information contained in the encoded data. When the numeric value that is output from the normalization information changing circuit 709 is a negative value, the calculating device 710 operates as a subtracting device. An output signal of the calculating device 710 is supplied to an adaptive bit allocation decoding circuit 706 and an output terminal 711.

The adaptive bit allocation decoding circuit 706 references the adaptive bit allocation information and deallocates the allocated bits. An output signal of the adaptive bit allocation decoding circuit 706 is supplied to inversely orthogonally transforming circuits 703, 704, and 705. The inversely orthogonally transforming circuits 703, 704, and 705 transform a frequency-base signal into a time-basis signal. An output signal of the inversely orthogonally transforming circuit 703 is supplied to a band combining filter 701. Output signals of the inversely orthogonally transforming circuit 704 and 705 are supplied to a band combining filter 702. Each of the inversely orthogonally transforming circuits 703, 704, and 705 may be composed of an inversely modified DCT transforming circuit (IMDCT).

The band combining filter 702 combines supplied signals and supplies the combined result to the band combining filter 701. The band combining filter 701 combines supplied signals and supplies the combined result to a terminal 700. In such a manner, time-base signals of separated sub bands that are output from the inversely orthogonally transforming circuits 703, 704, and 705 are decoded into a signal of the entire band. Each of the band combining filters 701 and 702 may be composed of for example an IQMF (Inverse Quadrature Mirror Filter).

On the other hand, the time unit of highly efficiently encoded information is supplied from the input terminal 712 to a change value calculating circuit 713. The change value calculating circuit 713 calculates a change value (adding value) for a change of scale factor information necessary for adjusting a time-base reproduction level (such as a fade-in operation and a fade-out operation) in the time unit of the supplied highly efficiently encoded information. The calculated change value is supplied to the normalization information changing circuit 709.

Information of frame numbers (order) of encoded data is supplied to the change value calculating circuit 713 through the input terminal 712. The change value calculating circuit 713 obtains the frame number of a current frame in frames whose normalization information is changed. In reality, in consideration of channels, starting from the first frame that is designated to 0, the frames are numbered at intervals of 212 bytes as shown in FIG. 3. The change value calculating circuit 713 calculates a change value corresponding to the obtained frame number.

The normalization information changing circuit 709 outputs a value to be added or subtracted to/from scale factor information of each unit block. The normalization information changing circuit 709 performs a process for outputting a value to be added or subtracted to/from scale factor information corresponding to the change value supplied from the change value calculating circuit 713 and a process for outputting a value to be added or subtracted to/from scale factor information corresponding to a command issued by the user or the like through an operation panel or the like. One of these processes is performed by the normalization information changing circuit 709 corresponding to a command issued by the user or the like through the operation panel or the like.

As with the first embodiment shown in FIG. 1, when scale factor information is controlled with an adding operation or a subtracting operation of the calculating device 710, the level of reproduction data can be adjusted with an increment of for example 2 dB. For example, when the same values that are output from the normalization information changing circuit 709 are added or subtracted to/from scale factor information of all the unit blocks, the level of all the unit blocks can be adjusted with an increment of 2 dB. In this process, scale factor information generated as the result of an adding operation or a subtracting operation is limited to the range of scale factor values defined in the applied format.

For example, when different values that are output from the normalization information changing circuit 709 are added or subtracted to/from scale factor information of the individual unit blocks, the levels of the individual unit blocks can be separately adjusted. As a result, a filtering function can be accomplished. In more reality, when the normalization information changing circuit 709 outputs a pair of a unit block number and a value to be added or subtracted to/from the scale factor information of the unit block, unit blocks and values to be added or subtracted to/from scale factor information of the unit blocks are correlated.

Figure 10:
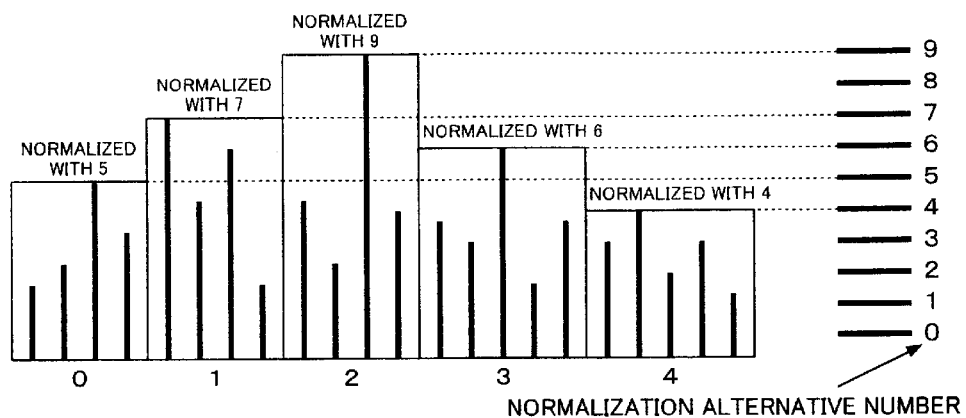
FIG. 10 is a graph showing normalization information whose sound field has not been processed.

When scale factor information is changed in the above-described manner, a level adjusting function and so forth for a decoded signal are accomplished. Next, such functions will be described in detail. First of all, a reproduction level adjusting function will be described. FIG. 10 shows an example of a normalizing process (block floating process) reflected to encoded data that is output from the adaptive bit allocation encoding circuits 106, 107, and 108. An alternative that is the maximum spectrum data or MDCT coefficient is selected from alternatives stored for each unit block in the memory or the like of the bit allocation calculating circuit 118. The number of the selected normalization alternative is defined as scale factor information of the unit block.

Such a process is performed for each unit block. In this case, it is assumed that the scale factor information of the block number 0 is 5 and the scale factor information of the block number 1 is 7. Likewise, the other blocks are correlated with scale factor information. As was described with reference to FIG. 3, scale factor information is written to encoded data.

Figure 11:
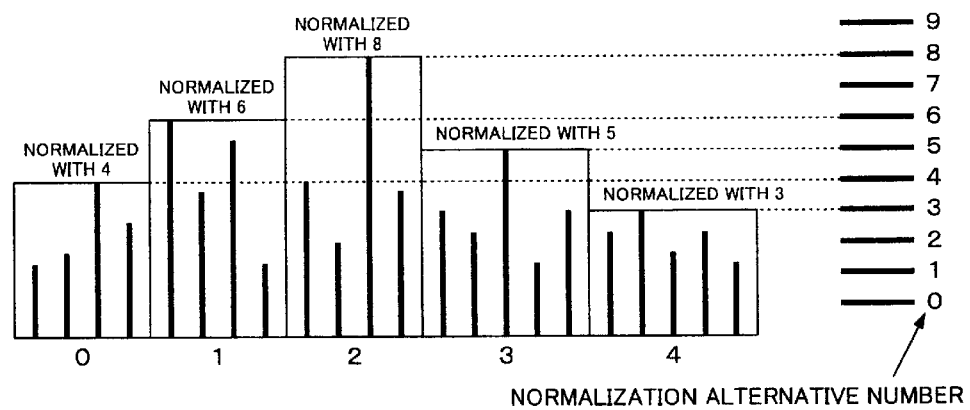
FIG. 11 is a graph showing a normalizing process in the case that a level is adjusted.

FIG. 11 shows an example of a process performed by the normalization information changing circuit 709 for scale factor information shown in FIG. 10. When the normalization information changing circuit 119 outputs the value "−1" for all unit blocks and the calculating devices 120, 121, and 122 add the value "−1" to scale factor information as shown in FIG. 10, spectrum data as shown in FIG. 11 is generated. Thus, the level adjusting process of which the signal level is decreased by for example 2 dB is performed.

Figure 12:
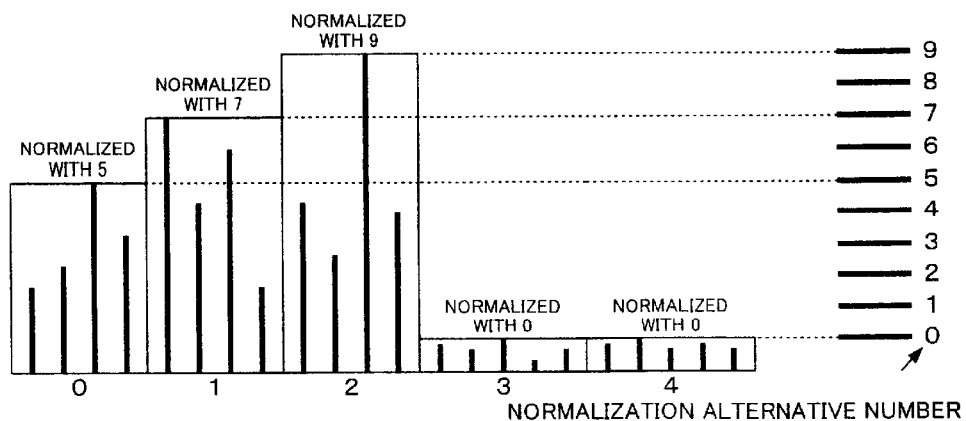
FIG. 12 is a graph showing a normalizing process in that case that a low pass filter process is performed.

FIG. 12 shows another example of a process performed by the normalization information changing circuit 709 for scale factor information contained in encoded data. As shown in FIG. 10, when the normalization information changing circuit 119 output the value "−6" for the block of the block number 3 and the value "−4" for the block of the block number 4 and then these values are added to scale factor information of the blocks of the block numbers 3 and 4, the scale factor values of the blocks of the block numbers 3 and 4 become "0" as shown in FIG. 12. As a result, a filtering process is performed. In the example shown in FIG. 12, by adding negative values (or subtracting positive values) to scale factor values, they become "0". Alternatively, a scale factor value of a desired block may be forcedly set to "0".

In the examples shown in FIGS. 10 to 12, the number of unit blocks is five (unit block 0 to unit block 4) and the number of normalization alternatives is 10 (normalization alternative 0 to 9). However, in the format of a real record medium such as an MD (Mini Disc) that a magneto optical disc, the number of unit blocks is 52 (unit block 0 to unit block 51) and the number of normalization alternatives is 64 (normalization alternative 0 to normalization alternative 63). In such a range, by finely designating unit blocks and parameters for changing scale factor information and so forth, the level adjusting process, the filtering process, and so forth can be more precisely performed.

Figure 13:
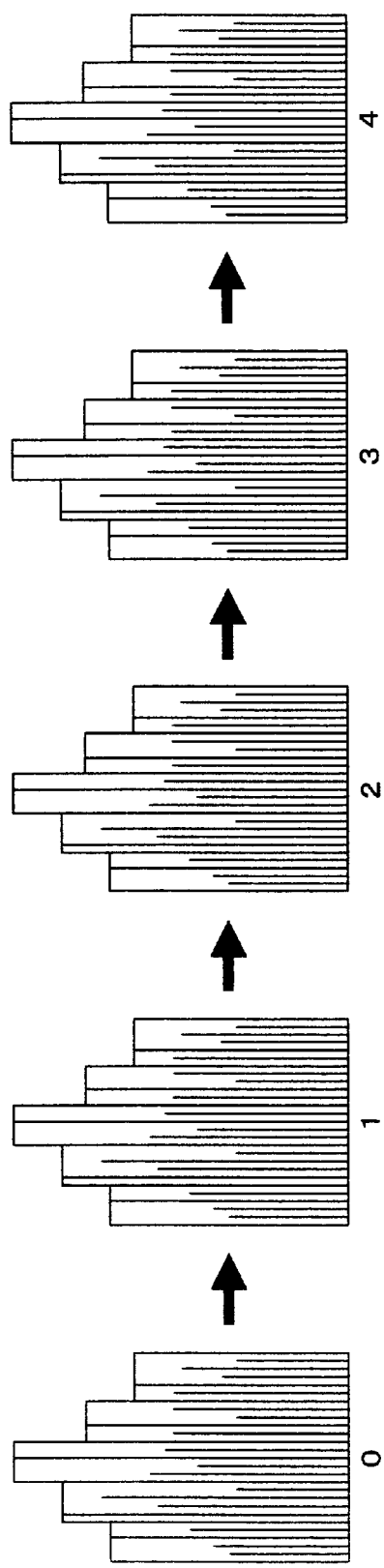
FIG. 13 is a schematic diagram showing a transition of normalization information whose sound file has not been processed.

In addition to the above-described process shown in FIGS. 10 to 12, according to the first embodiment and the second embodiment of the present invention, by changing a scale factor in the time base direction, for example a fading function, a wowing function, and so forth are accomplished. Next, an example of a scale factor changing process performed in the time base direction will be described. When scale factor information is not changed, as shown in FIG. 13, the scale factor information is output as encoded data in the order of frame 0 to frame 4 in the time base direction. In this example, it is assumed that each frame is composed of five blocks.

Figure 14:
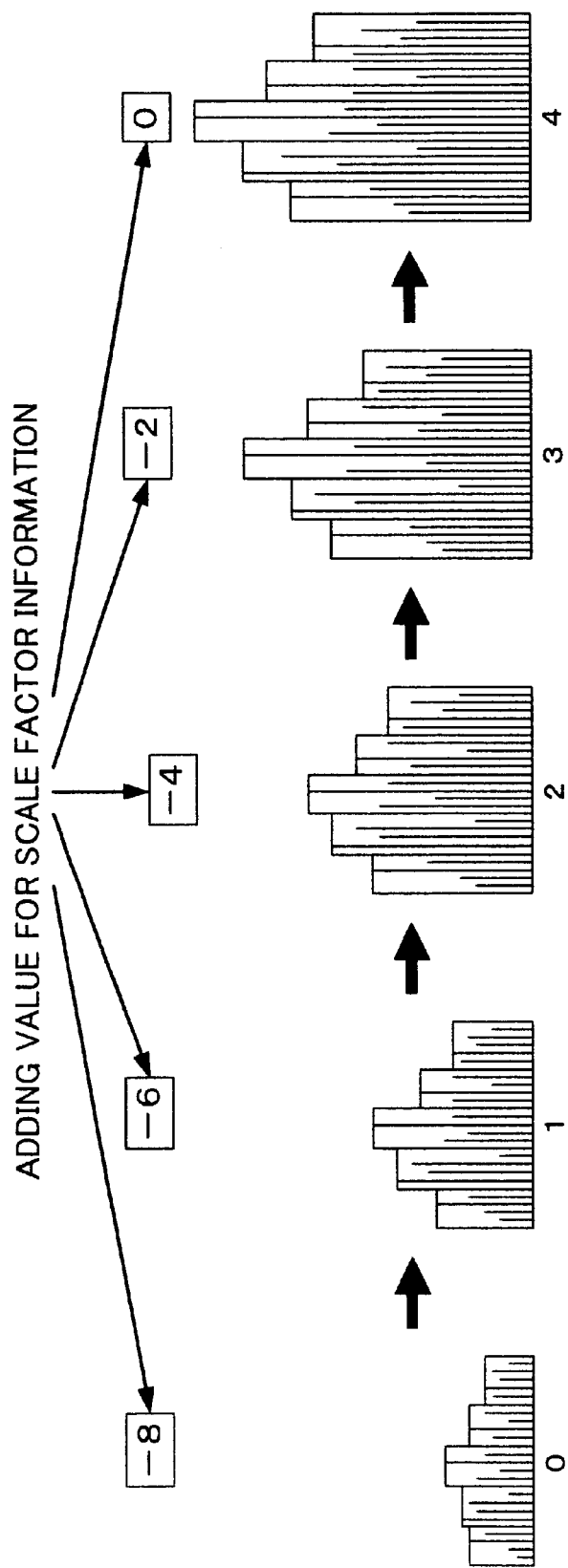
FIG. 14 is a schematic diagram showing a transition of normalization information in the case that a fading process is performed.

When the normalization information changing circuit 119 adds the value "−8" as a change value for scale factor information to the first frame (the frame 0 shown in FIG. 13) and increments the change value of each frame by the value "2", the change value of the frame 4 becomes "0". FIG. 14 shows data generated in such a process. In this example, the level increases in the time-base direction. As a result, the fade-in function is accomplished. For simplicity, in the example shown in FIGS. 13 and 14, spectrum data or MDCT coefficients of the frame 0 to frame 4 are the same. However, it is clear that the present invention can be applied to the case that spectrum data or MDCT coefficients of the frame 0 to frame 4 are different.

The above-described example is a very simple example. However, the normalization information changing circuit 119 can be more precisely designated for accomplishing a general fading function including a fade-out function. For example, since one frame is equivalent to around 11.6 msec, the relation between the number of frames and a desired level transition time period for a fade-in function or a fade-out function can be calculated by a dividing operation. Thus, corresponding to the calculated value, a desired level transition time period can be accomplished. In the above-described fade-in function, the level transition is performed corresponding to a straight line. Alternatively, the level transition may be performed corresponding to for example a sine curve or a logarithmic curve.

Figure 15:
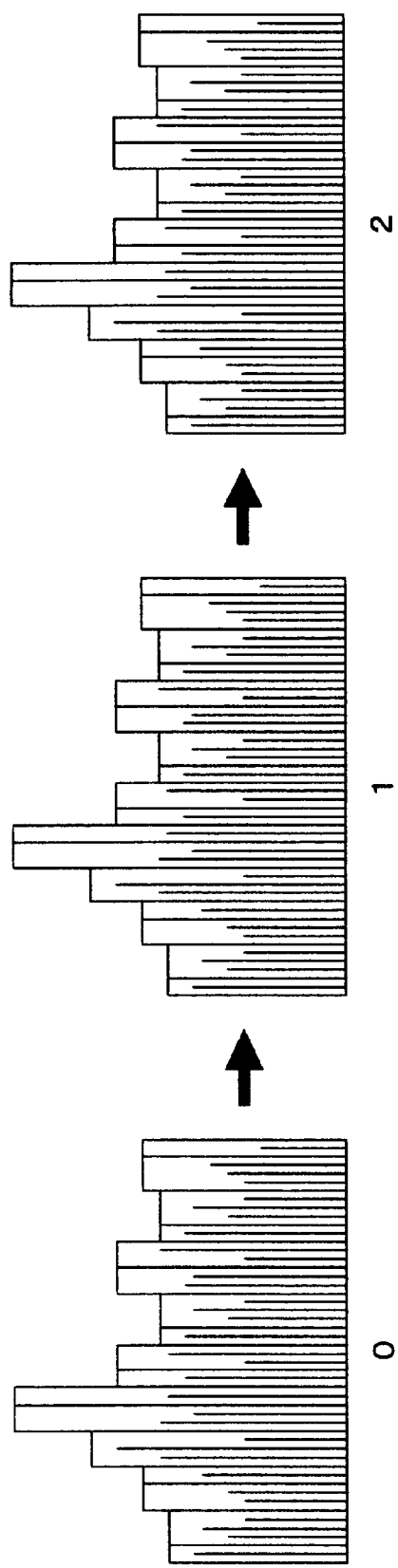
FIG. 15 is a schematic diagram showing a transition of normalization information in the case that a sound field has not been processed.

In the example of which scale factors are changed in the time-base direction, the reproduction levels are changed for individual frames. On the other hand, when a filtering condition, a frequency, and so forth are changed for each frame, a phase shifter and an effect function (such as a wowing function) can be accomplished. Next, such a case will be described. When scale factor information is not operated, it is assumed that encoded data is processed in the order of the frame 0, the frame 1, and the frame 2 (in the time-base direction) as shown in FIG. 15.

Figure 16:
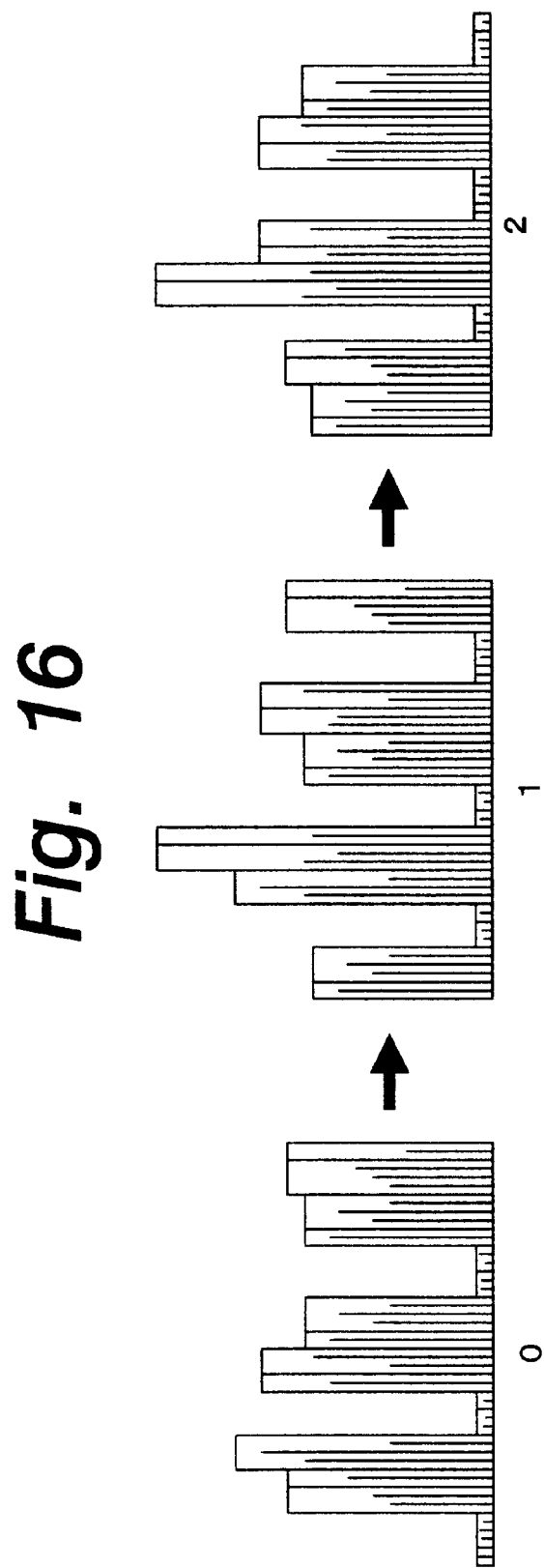
FIG. 16 is a schematic diagram showing a transition of normalization information in the case that a phase shifting process is performed.
Figure 17:
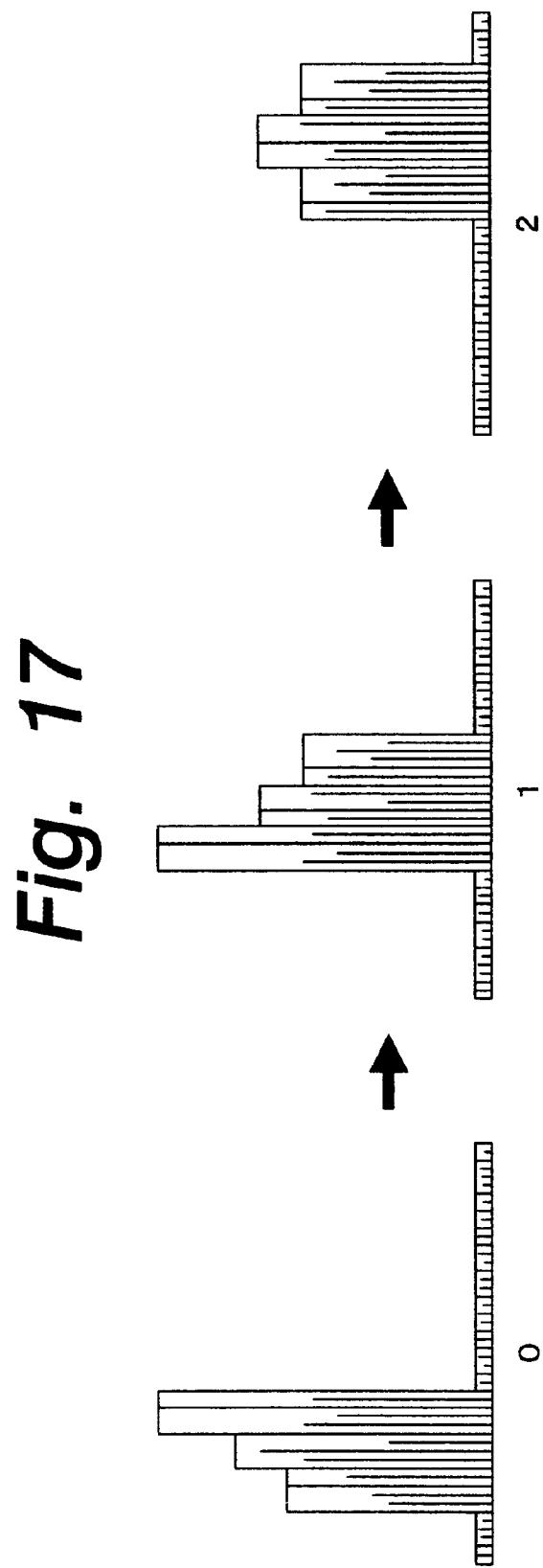
FIG. 17 is a schematic diagram showing a transition of normalization information in the case that a wow process is performed.

FIG. 16 shows the case that scale factor information of each unit block represents a very small level and unit blocks to be changed are varied for each frame. This operation is equivalent to the case that a notch filer or a comb filter is formed on the frequency-base and frequencies to be cut are varied with a time parameter. In such a manner, a phase shift function is accomplished. In addition, as shown in FIG. 17, when scale factor information is changed so that the levels of several unit blocks of each frame are set to 0, a wowing function can be accomplished.

As with the case of the fading function, when a cut level, a frequency to be cut, and so forth are precisely designated by the change value calculating circuit 713, the phase shifter function, the wowing function, and so forth can be accurately performed.

When a processing system that reproduces data from a record medium such as a magneto optical disc is added to the apparatus according to the second embodiment of the present invention, a reproducing apparatus that allows scale factor information of data that is reproduced from the record medium to be changed can be accomplished. In addition, by combining such a reproducing apparatus and a recoding apparatus of which the apparatus according to the first embodiment of the present invention is added to a processing system that records data to a record medium, a recording/reproducing apparatus that allows scale factor information of data that is reproduced from a record medium to be changed and the changed scale factor information to be reflected to the data recorded on the record medium can be accomplished.

In particular, when scale factor information changed through the output terminal 711 shown in FIG. 9 is supplied to a processing system that records data to a record medium, scale factor information recorded on the record medium can be rewritten with a simple structure. Thus, the result of the level adjusting operation that has been performed can be reflected to data recorded on a record medium. Thus, changed scale factor information can be permanently stored unless it is rewritten. In other words, a record medium of which a reproduction level is pre-adjusted and/or a fading function is pre-added can be accomplished. In addition, with a structure of which data is received from a wireless transmission path such as a radio transmission path to a processing system and the processing system generates data that is input to the apparatus according to the first embodiment of the present invention, a receiving apparatus that allows scale factor information or the like of data that is decoded to be changed can be accomplished.

In such a reproducing apparatus, a recording/reproducing apparatus, and a receiving apparatus, when the change value calculating circuit 713, the normalization information changing circuit 709, and the calculating device 710 are operated corresponding to an operation of the user or the like through an operation panel or the like, data of which a desired level is pre-adjusted or a filtering process is pre-performed can be reproduced, recorded, and output.

Next, as an example of an editing operation accomplished according to the present invention, a fade-in operation will be described in reality. In this example, it is assumed that an audio component system that includes recording/reproducing functions for a record medium such as an MD (Mini Disc) and that handles various types of sound sources (audio data and so forth of record mediums such as a CD (Compact Disc) and a magnetic tape and of a radio broadcast) is connected to a personal computer that is operated by the user or the like.

Figure 18:
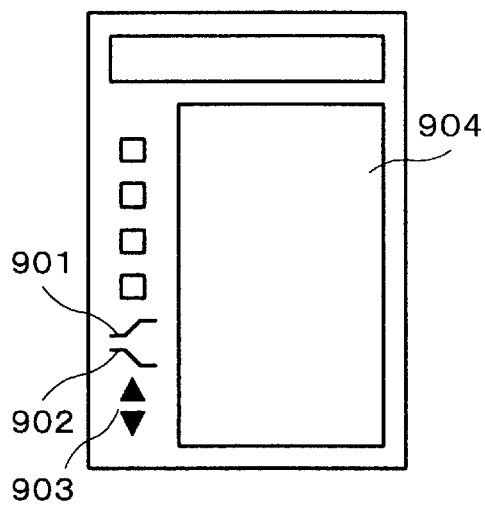
FIG. 18 is a schematic diagram showing a GUI (Graphic User Interface) for a sound field process.

FIG. 18 shows a first operation screen. The first operation screen is displayed on the monitor of the personal computer. The first operation screen has several display portions that can be operated with an operating portion such as a mouse. In FIG. 18, an icon 901 is an icon for a fade-in operation. When the icon 901 is clicked, the fade-in operation is performed. An icon 902 is an icon for a fade-out operation. When the icon 902 is clicked, the fade-out operation is performed. An icon 903 is an icon for a level adjusting operation. When the icon 903 is clicked, the level adjusting operation is performed. The other icons are used for editing operations such as a dividing operation, a joining operation, a moving operation, and an erasing operation of a music program. A display frame 904 is used to list tracks recorded on an MD. A desired track is selected with the mouse or the like on the display frame 904. Thus, on the first operation screen, an editing operation, a track selecting operation, and so forth can be performed.

Figure 19:
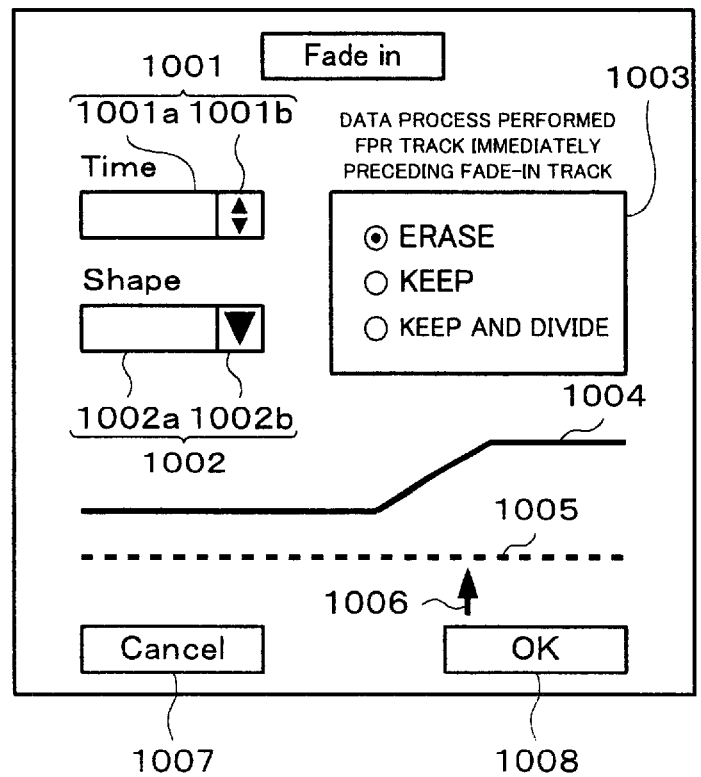
FIG. 19 is a schematic diagram showing an example of an operation screen of the GUI shown in FIG. 18.

FIG. 19 shows a second operation screen. As with the first operation screen, the second operation screen is also displayed on the monitor of the personal computer. The second operation screen has several display frames on which numeric values can be input with the clicking operation of the mouse or the like. In FIG. 19, a display frame 1001 is a display frame for designating time data. In a display frame 1001*a*, a fade-in time is displayed. When an up triangle button and a down triangle button shown in the display frame 1001*a* are clicked with the mouse, the fade-in time can be increased and decreased, respectively. The fade-in time can be designated in the range from for example 1 sec. to 15 sec. with an increment of 0.1 sec. A display frame 1002 is a display frame for designating a fade-in shape. When a triangle button in an indication 1002*b* is clicked with the mouse, several fade-in shapes are displayed. With a draw-and-drop operation, a desired fade-in shape can be selected. Examples of the fade-in shapes are a linear shape and non-linear shape (for example, sine curve).

A display frame 1003 is used to select a process performed for a track immediately preceding a fade-in track. In this example, one of three operations that are "erase", "keep", and "keep and divide" can be selected. An indication 1004 represents a fade-in shape. In this example, the selected fade-in shape is a linear shape. With the display frame 1002 or the like, another fade-in shape can be selected. In addition, with the indication 1004, a fade start position and a fade end position can be changed with the dragging operation of the mouse. Thus, when the fade length is changed, the value in the display frame 1001*a* is changed correspondingly thereto. An indication 1005 represents the time position of the track. When the time position represented with an arrow 1006 is changed with the dragging operation of the mouse, the time position of the fade-in track can be varied.

After designating operations for the display frames are performed, a trial reproducing operation corresponding to the designating operations is performed. This reproducing operation is referred to as rehearsal reproducing operation.

The rehearsal reproducing operation is repeatedly performed until the user changes the designated conditions or clicks a display frame 1008. In this example, the number of times of the rehearsal reproduction operation can be designated. When the designated conditions are changed, the rehearsal reproducing operation is performed corresponding to the newly designated conditions. When the display frame 1008 is clicked with the mouse, the designated conditions of the second operation screen are confirmed. With the confirmed designated conditions, a process for rewriting scale factors of for example a record medium is performed. When a display frame 1007 is clicked with the mouse, the designating operations are canceled and the second operation screen is switched to the first operation screen shown in FIG. 18.

In the above-described example, it was assumed that an audio component system is connected to a personal computer with which the user operates the audio component system. Alternatively, the user may operate the audio component system through an operation panel thereof or an infrared ray remote controller thereof. In this case, the input operation is performed with input buttons and/or a pointing device. When numeric values are input with a jog dial, the operability of the audio component system is improved.

Figure 20:
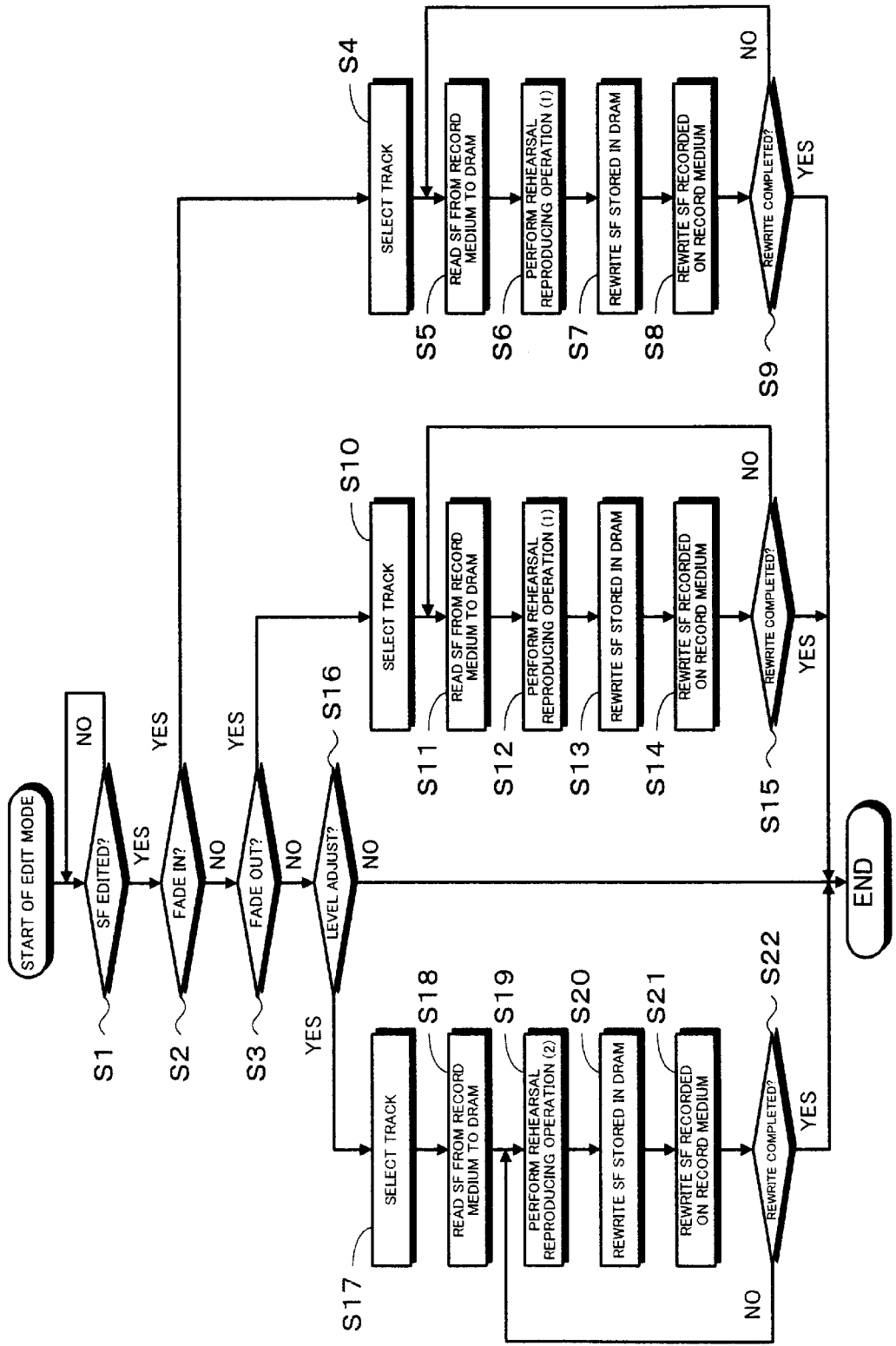
FIG. 20 is a flow chart showing a sound field editing process.

Next, an editing process according to the second embodiment of the present invention will be described. FIG. 20 shows an example of the editing process of the editing mode including the above-described fade-in operation, the fade-out operation, and the level adjusting operation. At steps S1, S2, S3, and S16, the user selects a desired operation. At step S1, it is determined whether or not a scale factor operation is performed. When the determined result at step S1 is Yes (namely, a scale factor operation is performed), the flow advances to step S2. Otherwise, the flow returns to step S1. In other words, at step S1, the user is prompted for the scale factor operation.

At step S2, it is determined whether or not a fade-in operation is performed. When the determined result at step S2 is Yes (namely, the fade-in operation is performed), the flow advances to step S4. Otherwise, the flow advances to step S3. At step S3, it is determined whether or not a fade-out operation is performed. When the determined result at step S3 is Yes (namely, the fade-out operation is performed), the flow advances to step S10. Otherwise, the flow advances to step S16. At step S16, it is determined whether or not a level adjusting operation is performed. When the determined result at step S16 is Yes, the flow advances to step S17. Otherwise, the editing mode is completed.

At step S4, the user selects a track for the fade-in operation. Thereafter, the flow advances to step S5. At step S5, scale factor information of the track selected at step S4 is read from a record medium such as an MD to a DRAM (Dynamic Random Access Memory) of the apparatus. Thereafter, the flow advances to step S6. At step S6, a routine for a rehearsal reproducing operation (1) (that will be described later) is performed. In the routine, parameters for time data, characteristics, edit positions, and so forth are designated (changed). Thereafter, the flow advances to step S7. At step S7, corresponding to the result of step S6, scale factor information stored in the DRAM is rewritten. Thereafter, the flow advances to step S8. At step S8, corresponding to the result of step S7, a scale factor recorded on the record medium is rewritten. Thereafter, the flow advances to step S9. At step S9, it is determined whether or not the rewriting process has been completed. When the determined result at step S9 is Yes (namely, the rewriting process has been completed), the editing process is completed. Otherwise, the flow returns to step S5. At step S5, the rewriting process is repeatedly performed.

At step S10, the user selects a tack for the fade-out operation. Thereafter, the flow advances to step S11. At step S11, the scale factor information for the track selected at step S10 is read from the record medium such as an MD to the DRAM of the apparatus. Thereafter, the flow advances to step S12. At step S12, the routine for the rehearsal reproducing operation (1) is performed. Thus, parameters for time data, characteristics, edit positions, and so forth are designated (changed). Thereafter, the flow advances to step S13. At step S13, corresponding to the result of step S12, scale factor information stored in the DRAM is rewritten. Thereafter, the flow advances to step S14. At step S14, corresponding to the result of step S13, a scale factor recorded on the record medium is rewritten. Thereafter, the flow advances to step S15. At step S15, it is determined whether or not the rewriting process has been completed. When the determined result at step S15 is Yes (namely, the rewriting process has been completed), the editing process is completed. Otherwise, the flow returns to step S11. At step S11, the rewriting process is repeatedly performed.

At step S17, the user selects a track for the level adjusting operation. Thereafter, the flow advances to step S18. At step S18, the scale factor information of the track selected at step S17 is read from the record medium such as an MD to the DRAM of the apparatus. Thereafter, the flow advances to step S19. At step S19, a routine for a rehearsal reproducing operation (2) (that will be described later) is performed. Thus, parameters for time data, characteristics, edit positions, and so forth are designated (changed). Thereafter, the flow advances to step S20. At step S20, corresponding to the result of step S19, the scale factor information stored in the DRAM is rewritten. Thereafter, the flow advances to step S21. At step S21, corresponding to the result of step S20, the scale factor recorded on the record medium is rewritten. Thereafter, the flow advances to step S22. At step S22, it is determined whether or not the rewriting process has been completed. When the determined result at step S22 is Yes (namely, the rewriting process has been completed), the editing process is completed. Otherwise, the flow returns to step S20. At step S20, the rewriting process is repeatedly performed.

Figure 21:
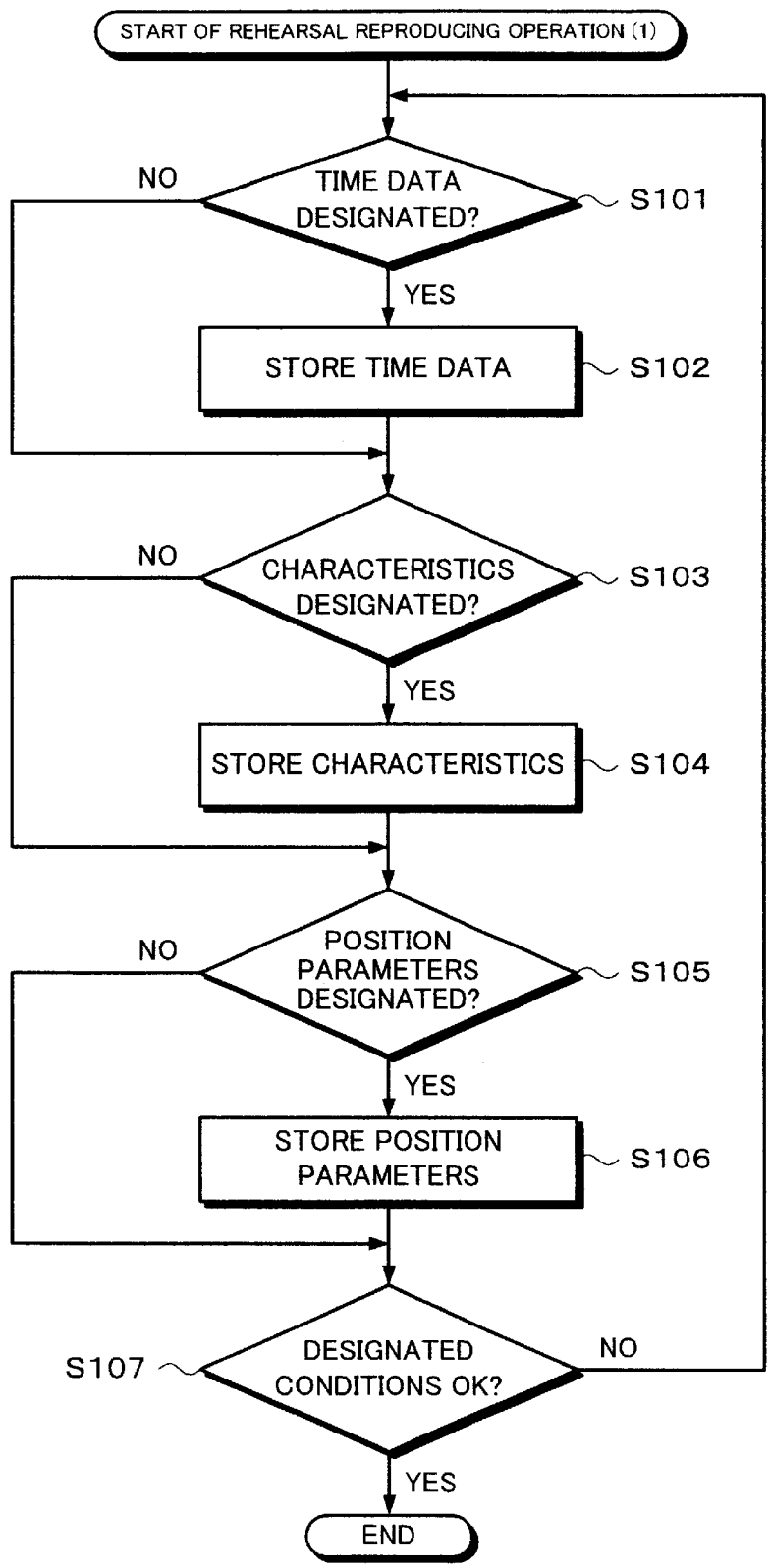
FIG. 21 is a flow chart showing a rehearsal reproducing process.

FIG. 21 shows an example of the routine for the rehearsal reproducing operation (1). Initial values of the parameters for time data, characteristics, and positions for the rehearsal reproducing operation (1) are pre-designated. When the rehearsal reproducing operation (1) is performed, an audio signal corresponding to the initial values is output. While the user listens to the audio sound corresponding to the initial values, he or she can designate various operations after step S101. At step S101, it is determined whether or not the user designate time data (namely, the user changes initial values of parameters of time data such as fade time and so forth).

When the determined result at step S101 is Yes (namely, the user has changed the initial values of the parameters of the time data), the flow advances to step S102. Otherwise, the flow advances to step S103. At step S102, the parameters of the time data that have been input by the user are stored. Thereafter, the flow advances to step S103. At step S103, it is determined whether the user designates characteristics (namely, the initial values of parameters of characteristics).

When the determined result at step S103 is Yes (namely, the user has changed the initial values of the parameters of the characteristics such a fade shape), the flow advances to step S104. Otherwise, the flow advances to step S105. At step S104, the parameters of the characteristics that have been input by the user are stored. Thereafter, the flow advances to step S105. At step S105, it is determined whether or not the user designates parameters of positions (namely, the initial values of the parameters of an edit position).

When the determined result at step S05 is Yes (namely, the user has changed the initial values of the parameters of the edit position), the flow advances to step S106. Otherwise, the flow advances to step S107. At step S106, the changed position parameters that have been input by the user are stored. Thereafter, as the rehearsal reproducing operation (1), an audio signal corresponding to the changed parameters of the time data, characteristics, and positons is output.

At step S107, it is determined whether or not the user confirms the designated conditions. When the determined result at step S107 is Yes (namely, the user has confirmed the designated conditions), the rehearsal reproducing operation (1) is completed. Otherwise (when the user has not confirmed the designated conditions), the flow returns to step S101. The rehearsal reproducing operation (1) is repeatedly performed until the user confirms the designated conditions at step S107. Alternatively, the rehearsal reproducing operation (1) is repeatedly performed a predetermined number of times. Thus, the user can confirm the designated conditions after he or she listens to the audio sound several times.

Figure 22:
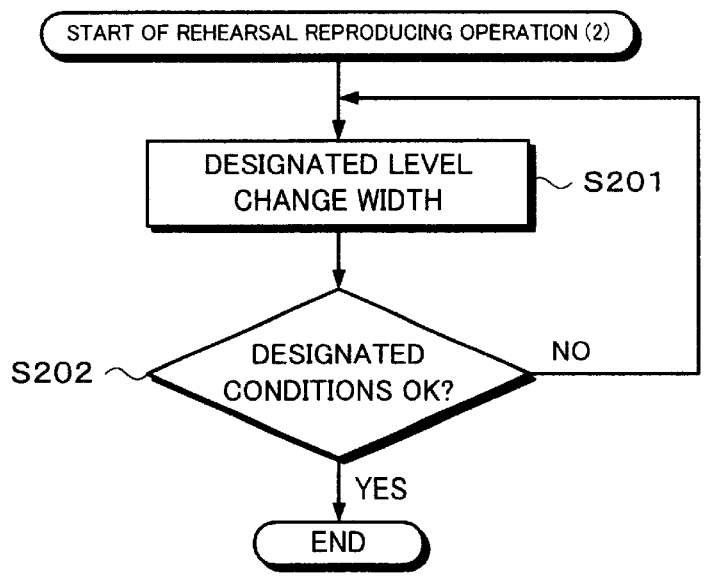
FIG. 22 is a flow chart showing another rehearsal reproducing process.

FIG. 22 shows an example of the routine for the rehearsal reproducing operation (2). Initial values for the level controlling operation is pre-designated. When the rehearsal reproducing operation (2) is started, a reproduced sound corresponding to the initial values is output. At step S201, a level change width is designated. In other words, at step S201, the user is prompted for a level change width. In this example, the level change width can be designated (selected) in the range of ±12 dB with an increment of 2 dB. Thereafter, an audio sound corresponding to the designated level change width is output.

Thereafter, the flow advances to step S202. At step S202, it determined whether or not the user confirms the designated conditions (namely, after the user has listened to an audio sound as the rehearsal reproducing operation (2), the user confirms the designated conditions or re-designates conditions). When the determined result at step S202 is Yes (namely, the user has confirmed the designated conditions), the rehearsal reproducing operation (2) is completed. Otherwise (namely, the user re-designates conditions), the flow returns to step S201. The rehearsal reproducing operation (2) is repeatedly performed until the user confirms the designated conditions. Alternatively, the rehearsal reproducing operation (2) is repeatedly performed a predetermined number of times. Thus, after the user listens to an audio sound several times, he or she can confirm the designated conditions at step S202.

Figure 23:
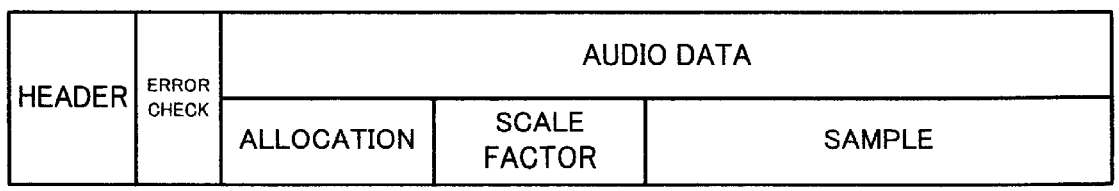
FIG. 23 is a schematic diagram showing the data structure of an encoded data format.

According to the first embodiment and the second embodiment of the present invention, in a combination of MDCT, band division considering the hearing characteristics of humans, and bit allocations of individual sub bands, a normalizing process and a quantizing process are performed in each sub band for encoded data corresponding to a highly efficiently encoding method. Alternatively, the present invention can be applied to another encoding method such as an encoding data format corresponding to the MPEG audio standard. FIG. 23 shows an encoding data format corresponding to the MPEG audio standard.

The header is composed of 32 bits (fixed length). The header contains information of a synchronous word, an ID, a layer, a protection bit, a bit rate index, a sampling frequency, a padding bit, a private bit, a mode, data representing that data has been copyright protected, data representing original/copy, an emphasis, and so forth. The header is followed by error check data (option). The error check data is followed by audio data. Since audio data contains ring allocation information and scale factor information along with sample data, the present invention can be applied to such a data format.

In an apparatus that contains both an encoding structure and a decoding structure (namely, the above-described recording/reproducing apparatus), a normalization information changing circuit may be disposed in either or both the encoding structure and the decoding structure. An output signal of the encoding apparatus may be recorded to a record medium (for example, a magnetic tape, a magnetic disc, or a magneto optical disc) or a semiconductor record medium (for example, an IC memory or a memory card). Alternatively, the output signal of the encoding apparatus may be transmitted through a wireless transmission path (such as radio wave, light (infra red ray), or the like) or a wired communication path (such as a wired cable or an optical cable).

A digital signal that is encoded by the encoding apparatus may be a digital audio signal (a talking voice of a human, a singing voice, or an instrumental sound), a digital video signal, or the like.

According to the present invention, normalization information can be changed so that normalization information such as scale factor information of two-dimensional blocks of encoded data of a digital audio signal or the like is varied corresponding to parameters of time data.

Thus, various functions such as a fade-in function and a fade-out function in a desired volume (level) changed in the time base direction can be accomplished. In addition, frequency cutting functions such as a phase-shifter and a wowing function can be easily accomplished.

In addition, corresponding to a change of normalization information corresponding to the above-described functions accomplished by for example a user's operation in the reproducing mode, when normalization information recorded on a record medium is rewritten, an accomplished function can be kept.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An encoding apparatus for highly efficiently encoding an input digital signal, comprising:

band dividing means for dividing the input digital signal into a plurality of frequency band components;

encoding means for block-segmenting a sequence of samples arranged in a time-base direction and/or a frequency-base direction of the input digital signal divided in the plurality of frequency band components and encoding each block;

normalization processing means for normalizing a signal component of each block encoded by said encoding means and generating normalization signal;

quantization coefficient calculating means for calculating quantization coefficients that represent a feature of the signal component of each block;

bit allocating means for deciding the number of allocated bits for each block corresponding to the quantization coefficients calculated by said quantization coefficient calculating means;

normalization information changing means for gradually changing the normalization information generated by said normalization processing means corresponding to a user's operation on a time base; and encoded data generating means for re-quantizing the signal component of each block corresponding to the normalization information changed by said normalization information changing means and the number of allocated bits allocated by said bit allocating means and generating encoded data corresponding to a predetermined format.

2. The encoding apparatus as set forth in claim 1, wherein said normalization information changing means gradually changes only normalization information contained in a block corresponding to a particular frequency band component on the time base so as to perform a filtering process.

3. The encoding apparatus as set forth in claim 1, wherein said normalization information changing means equally changes normalization information contained in blocks corresponding to all the frequency band components so as to perform a level controlling process.

4. The encoding apparatus as set forth in claim 1, wherein said normalization information changing means gradually equally changes normalization information contained in blocks corresponding to all the frequency band components so as to perform a fader controlling process.

5. The encoding apparatus as set forth in claim 1, wherein said normalization information changing means gradually changes frequency band components that contain normalization information to be changed on the time base so as to perform a sound effect process.

6. An encoding method for highly efficiently encoding an input digital signal, comprising the steps of:

(a) dividing the input digital signal into a plurality of frequency band components;

(b) block-segmenting a sequence of samples arranged in a time-base direction and/or a frequency-base direction of the input digital signal divided in the plurality of frequency band components and encoding each block;

(c) normalizing a signal component of each block encoded at step (b) and generating normalization signal;

(d) calculating quantization coefficients that represent a feature of the signal component of each block;

(e) deciding the number of allocated bits for each block corresponding to the quantization coefficients calculated at step (d);

(f) gradually changing the normalization information generated at step (c) corresponding to a user's operation on a time base; and (g) re-quantizing the signal component of each block corresponding to the normalization information changed at step (f) and the number of allocated bits allocated at step (e) and generating encoded data corresponding to a predetermined format.

7. A decoding apparatus for decoding a digital signal that has been highly efficiently encoded, comprising:

normalization information changing means for changing normalization information contained in encoded data that is input corresponding to a user's operation;

bit allocation decoding means for deallocating allocated bits corresponding to the normalization information changed by said normalization information changing means and to bit allocation information contained in the input encoded data;

a plurality of decoding means for decoding an output signal deallocated by said bit allocation decoding means into a time-base sample sequence corresponding to block size information contained in the encoded data for each frequency band component; and filtering means for combining signals of all the frequency band components that are output from said plurality of decoding means and generating a decoded signal of all the frequency band.

8. The decoding apparatus as set forth in claim 7, wherein said normalization information changing means gradually changes only normalization information contained in a block corresponding to a particular frequency band component on the time base so as to perform a filtering process.

9. The decoding apparatus as set forth in claim 7, wherein said normalization information changing means equally changes normalization information contained in blocks corresponding to all the frequency band components so as to perform a level controlling process.

10. The decoding apparatus as set forth in claim 7, wherein said normalization information changing means gradually equally changes normalization information contained in blocks corresponding to all the frequency band components so as to perform a fader controlling process.

11. The decoding apparatus as set forth in claim 7, wherein said normalization information changing means gradually changes frequency band components that contain normalization information to be changed on the time base so as to perform a sound effect process.

12. A decoding method for decoding a digital signal that has been highly efficiently encoded, comprising the steps of:

(a) receiving encoded data containing normalized information and block size information;

(b) changing normalization information contained in encoded data that is input corresponding to a user's operation;

(c) deallocating allocated bits corresponding to the normalization information changed at step (b) and to bit allocation information contained in the received encoded data;

(d) decoding an output signal deallocated at step (c) into a time-base sample sequence corresponding to block size information contained in the received encoded data for each frequency band component; and (e) combining signals of all the frequency band components that are output at step (d) and generating a decoded signal of all the frequency band.

13. A recording apparatus for highly efficiently encoding an input digital signal and recording the encoded signal to a record medium, comprising:

band dividing means for dividing the input digital signal into a plurality of frequency band components;

encoding means for block-segmenting a sequence of samples arranged in a time-base direction and/or a frequency-base direction of the input digital signal divided in the plurality of frequency band components and encoding each block;

normalization processing means for normalizing a signal component of each block encoded by said encoding means and generating normalization signal;

quantization coefficient calculating means for calculating quantization coefficients that represent a feature of the signal component of each block;

bit allocating means for deciding the number of allocated bits for each block corresponding to the quantization coefficients calculated by said quantization coefficient calculating means;

normalization information changing means for gradually changing the normalization information generated by said normalization processing means corresponding to a user's operation on a time base;

encoded data generating means for re-quantizing the signal component of each block corresponding to the normalization information changed by said normalization information changing means and the number of allocated bits allocated by said bit allocating means and generating encoded data corresponding to a predetermined format; and recording means for recording encoded data generated by said encoded data generating means to the record medium.

14. The recording apparatus as set forth in claim 13,
wherein said normalization information changing means gradually changes only normalization information contained in a block corresponding to a particular frequency band component on the time base so as to perform a filtering process.

15. The recording apparatus as set forth in claim 13,
wherein said normalization information changing means equally changes normalization information contained in blocks corresponding to all the frequency band components so as to perform a level controlling process.

16. The recording apparatus as set forth in claim 13,
wherein said normalization information changing means gradually equally changes normalization information contained in blocks corresponding to all the frequency band components so as to perform a fader controlling process.

17. The recording apparatus as set forth in claim 13,
wherein said normalization information changing means gradually changes frequency band components that contain normalization information to be changed on the time base so as to perform a sound effect process.

18. A recording method for highly efficiently encoding an input digital signal and recording the encoded signal to a record medium, comprising the steps of:

(a) dividing the input digital signal into a plurality of frequency band components;

(b) block-segmenting a sequence of samples arranged in a time-base direction and/or a frequency-base direction of the input digital signal divided in the plurality of frequency band components and encoding each block;

(c) normalizing a signal component of each block encoded at step (b) and generating normalization signal;

(d) calculating quantization coefficients that represent a feature of the signal component of each block;

(e) deciding the number of allocated bits for each block corresponding to the quantization coefficients calculated at step (d);

(f) gradually changing the normalization information generated at step (c) corresponding to a user's operation on a time base;

(g) re-quantizing the signal component of each block corresponding to the normalization information changed at step (f) and the number of allocated bits allocated at step (e) and generating encoded data corresponding to a predetermined format; and (h) recording encoded data generated at step (g) to the record medium.

19. A reproducing apparatus for reproducing a digital signal that has been highly efficiently encoded from a record medium, comprising:

reproducing means for reproducing the highly efficiently encoded digital signal from the record medium;

normalization information changing means for changing normalization information contained in encoded data that is input corresponding to a user's operation;

bit allocation decoding means for deallocating allocated bits corresponding to the normalization information changed by said normalization information changing means and to bit allocation information contained in the digital signal reproduced by said reproducing means;

a plurality of decoding means for decoding an output signal deallocated by said bit allocation decoding means into a time-base sample sequence corresponding to block size information contained in the encoded data for each frequency band component; and filtering means for combining signals of all the frequency band components that are output from said plurality of decoding means and generating a decoded signal of all the frequency band.

20. The reproducing apparatus as set forth in claim 19,
wherein said normalization information changing means gradually changes only normalization information contained in a block corresponding to a particular frequency band component on the time base so as to perform a filtering process.

21. The reproducing apparatus as set forth in claim 19,
wherein said normalization information changing means equally changes normalization information contained in blocks corresponding to all the frequency band components so as to perform a level controlling process.

22. The reproducing apparatus as set forth in claim 19,
wherein said normalization information changing means gradually equally changes normalization information contained in blocks corresponding to all the frequency band components so as to perform a fader controlling process.

23. The reproducing apparatus as set forth in claim 19,
wherein said normalization information changing means gradually changes frequency band components that contain normalization information to be changed on the time base so as to perform a sound effect process.

24. The reproducing apparatus as set forth in claims 19, further comprising:

first operating means for designating time information of a digital signal whose normalization information is changed; and second operating means for designating a sound field processing mode to the digital signal reproduced corresponding to the time information designated by said first operating means.

25. A reproducing method for reproducing a digital signal that has been highly efficiently encoded from a record medium, comprising the steps of:

(a) reproducing the highly efficiently encoded digital signal from the record medium;

(b) changing normalization information contained in encoded data that is input corresponding to a user's operation;

(c) deallocating allocated bits corresponding to the normalization information changed at step (b) and to bit allocation information contained in the digital signal reproduced at step (a);

(d) decoding an output signal deallocated at step (c) into a time-base sample sequence corresponding to block size information contained in the encoded data for each frequency band component; and (e) combining signals of all the frequency band components that are output at step (d) and generating a decoded signal of all the frequency band.

26. A record medium for recording encoded data generated by the steps of:

(a) dividing the input digital signal into a plurality of frequency band components;

(b) block-segmenting a sequence of samples arranged in a time-base direction and/or a frequency-base direction of the input digital signal divided in the plurality of frequency band components and encoding each block;

(c) normalizing a signal component of each block encoded at step (b) and generating normalization signal;

(d) calculating quantization coefficients that represent a feature of the signal component of each block;

(e) deciding the number of allocated bits for each block corresponding to the quantization coefficients calculated at step (d);

(f) gradually changing the normalization information generated at step (c) corresponding to a user's operation on a time base; and (g) re-quantizing the signal component of each block corresponding to the normalization information changed at step (f) and the number of allocated bits allocated at step (e) and generating encoded data corresponding to a predetermined format.

27. The record medium as set forth in claim 26, wherein the record medium is one of a disc, a tape, or a semiconductor memory.

* * * * *

UNITED STATES PATENT AND TRADEMARK OFFICE
CERTIFICATE OF CORRECTION

PATENT NO. : 6,735,252 B1
DATED : May 11, 2004
INVENTOR(S) : Koyata et al.

It is certified that error appears in the above-identified patent and that said Letters Patent is hereby corrected as shown below:

Column 1,
Line 48-49, change "speech in sub bands" Bell Syst. Tech. J. Vol. 55. No. 8 (1976)." to
-- speech in sub bands" Bell Syst. Tech. J. Vol. 55. No. 8 (1976) --.

Column 11,
Lines 23, 26, and 32, change "level a corresponding" to -- level α corresponding --.

Column 14,
Line 12, change "117 is" to -- 117) is --.

Signed and Sealed this

Fourteenth Day of December, 2004

JON W. DUDAS
*Director of the United States Patent and Trademark Office*